(12) United States Patent
Ihalainen et al.

(10) Patent No.: US 11,477,058 B2
(45) Date of Patent: Oct. 18, 2022

(54) INTER-CARRIER INTERFERENCE COMPENSATION

(71) Applicant: Nokia Technologies Oy, Espoo (FI)

(72) Inventors: Tero Ihalainen, Nokia (FI); Kari Pajukoski, Oulu (FI); Toni Levanen, Tampere (FI); Ville Syrjälä, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 124 days.

(21) Appl. No.: 16/637,689

(22) PCT Filed: Aug. 11, 2017

(86) PCT No.: PCT/FI2017/050569
§ 371 (c)(1),
(2) Date: Feb. 7, 2020

(87) PCT Pub. No.: WO2019/030426
PCT Pub. Date: Feb. 14, 2019

(65) Prior Publication Data
US 2021/0367815 A1 Nov. 25, 2021

(51) Int. Cl.
*H04L 25/03* (2006.01)
*H04L 27/26* (2006.01)

(52) U.S. Cl.
CPC .... *H04L 25/03821* (2013.01); *H04L 27/2647* (2013.01)

(58) Field of Classification Search
CPC . H04L 25/03; H04L 27/26; H04L 5/00; H04L 27/2613; H04L 27/2691;
(Continued)

(56) References Cited

U.S. PATENT DOCUMENTS

| 7,995,688 B2* | 8/2011 | Hong | H04L 25/022 375/285 |
| 8,054,917 B2* | 11/2011 | Huang | H04L 25/0204 375/340 |

(Continued)

FOREIGN PATENT DOCUMENTS

| CA | 2 627 057 A1 | 9/2008 |
| CN | 102780656 A | 11/2012 |

(Continued)

OTHER PUBLICATIONS

"3rd Generation Partnership Project; Technical Specification Group Radio Access Network; Study on performance enhancements for high speed scenario in LTE (Release 13)", 3GPP TR 36.878, V13.0.0, Jan. 2016, pp. 1-92.

(Continued)

*Primary Examiner* — Man U Phan
(74) *Attorney, Agent, or Firm* — Squire Patton Boggs (US) LLP

(57) ABSTRACT

An inter-carrier interference method comprises: receiving one or more OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type; for each of the plural blocks of subcarriers of the first type, estimating inter-carrier interference components; estimating inter-carrier interference components for the subcarriers of the second type using the inter-carrier interference components estimated for the plural blocks of subcarriers of the first type; and compensating for inter-carrier interference in the plural blocks of subcarriers of the second type using the inter-carrier interference components estimated for the sub-car- (Continued)

riers of the second type, thereby to generate plural compensated blocks of subcarriers of the second type.

21 Claims, 11 Drawing Sheets

(58) Field of Classification Search
CPC .......... H04L 2027/0026; H04L 5/0053; H04L 5/0048; H04L 5/0007; H04L 2027/0087; H04L 25/03821; H04L 2027/0016; H04B 7/2621
USPC ........................................................ 370/343
See application file for complete search history.

(56) References Cited

U.S. PATENT DOCUMENTS

| | | | | |
|---|---|---|---|---|
| 8,223,862 | B2* | 7/2012 | Al-Naffouri | H04L 27/2647 375/348 |
| 8,335,284 | B1* | 12/2012 | Lee | H04L 25/0232 375/348 |
| 8,428,158 | B2* | 4/2013 | Maltsev | H04L 25/023 375/260 |
| 8,503,553 | B2* | 8/2013 | Schmidl | H04W 4/80 375/267 |
| 8,611,444 | B2* | 12/2013 | Shih | H04L 25/03821 375/261 |
| 8,614,979 | B2 | 12/2013 | Cox et al. | |
| 10,419,248 | B2* | 9/2019 | Dezfooliyan | H04L 27/2334 |
| 10,735,983 | B2* | 8/2020 | Yoo | H04L 5/0057 |
| 10,944,520 | B2* | 3/2021 | Maleki | H04L 5/0051 |
| 2007/0211827 | A1* | 9/2007 | Baggen | H04L 25/022 375/316 |
| 2009/0052566 | A1 | 2/2009 | Maltsev et al. | |
| 2012/0328054 | A1 | 12/2012 | Shih | |
| 2014/0270015 | A1* | 9/2014 | Kravtsov | H04B 1/12 375/343 |

FOREIGN PATENT DOCUMENTS

| | | |
|---|---|---|
| EP | 1641206 A2 | 3/2006 |
| EP | 3 002 920 A1 | 4/2016 |

OTHER PUBLICATIONS

"3rd Generation Partnership Project; Technical Specification Group Radio Access Network; Study on New Radio Access Technology Physical Layer Aspects (Release 14)", 3GPP TR 38.802, V14.0.0, Mar. 2017, pp. 1-143.

Yang et al., "A Novel Doppler Frequency Offset Estimation Method for DVB-T System in HST Environment", IEEE Transactions on Broadcasting, vol. 58, No. 1, Mar. 2012, pp. 139-143.

Fan et al., "Doppler Shift Estimation for High-Speed Railway Wireless Communication Systems with Large-Scale Linear Antennas", International Workshop on High Mobility Wireless Communications (HMWC), Oct. 21-23, 2015, pp. 96-100.

"Effects of Phase Noise on OFDM Systems With and Without PLL: Characterization and Compensation", IEEE Transactions on Communications, vol. 55, No. 8, Aug. 2007, pp. 1607-1616.

Syrjala et al., "Receiver DSP for OFDM Systems Impaired by Transmitter and Receiver Phase Noise", IEEE International Conference on Communications (ICC), Jun. 5-9, 2011, 6 pages.

Syrjala et al., "Iterative Receiver Signal Processing for Joint Mitigation of Transmitter and Receiver Phase Noise in OFDM-Based Cognitive Radio Link", International Conference on Cognitive Radio Oriented Wireless Networks, 2012, 5 pages.

"3rd Generation Partnership Project; Technical Specification Group Radio Access Network; Study on channel model for frequency spectrum above 6 GHz (Release 14)", 3GPP TR 38.900, V14.2.0, Dec. 2016, pp. 1-84.

Ren et al., "Compressed Channel Estimation with Position-based ICI Elimination for High-mobility Simo-OFDM Systems", IEEE Transactions on Vehicular Technology, vol. 65, No. 8, Aug. 2016, pp. 6204-6216.

Hoeher et al., "Two-Dimensional Pilot-Symbol-Aided Channel Estimation by Wiener Filtering", IEEE International Conference on Acoustics, Speech, and Signal Processing, Apr. 21-24, 1997, pp. 1845-1848.

International Search Report and Written Opinion received for corresponding Patent Cooperation Treaty Application No. PCT/FI2017/050569, dated May 4, 2018, 16 pages.

Rabiei et al., "Pilot Design for OFDM Systems in the Presence of Phase Noise", Conference Record of the Forty Fourth Asilomar Conference on Signals, Systems and Computers, Nov. 7-10, 2010, pp. 516-520.

Yang et al., "Novel Consecutive-Pilot Design for Phase Noise Suppression in OFDM System", IEICE Transactions on Fundamentals of Electronics Communications and Computer Sciences, vol. E92-A, No. 7, Jul. 2009, pp. 1704-1707.

Yang et al., "Phase Noise Correction Based on TPS Symbols for the Chinese DTTB System", IEEE Transactions on Broadcasting, vol. 54, No. 4, Dec. 2008, pp. 799-805.

Chinese Office Action corresponding to CN Application No. 201780095758.X, dated Aug. 24, 2022.

* cited by examiner

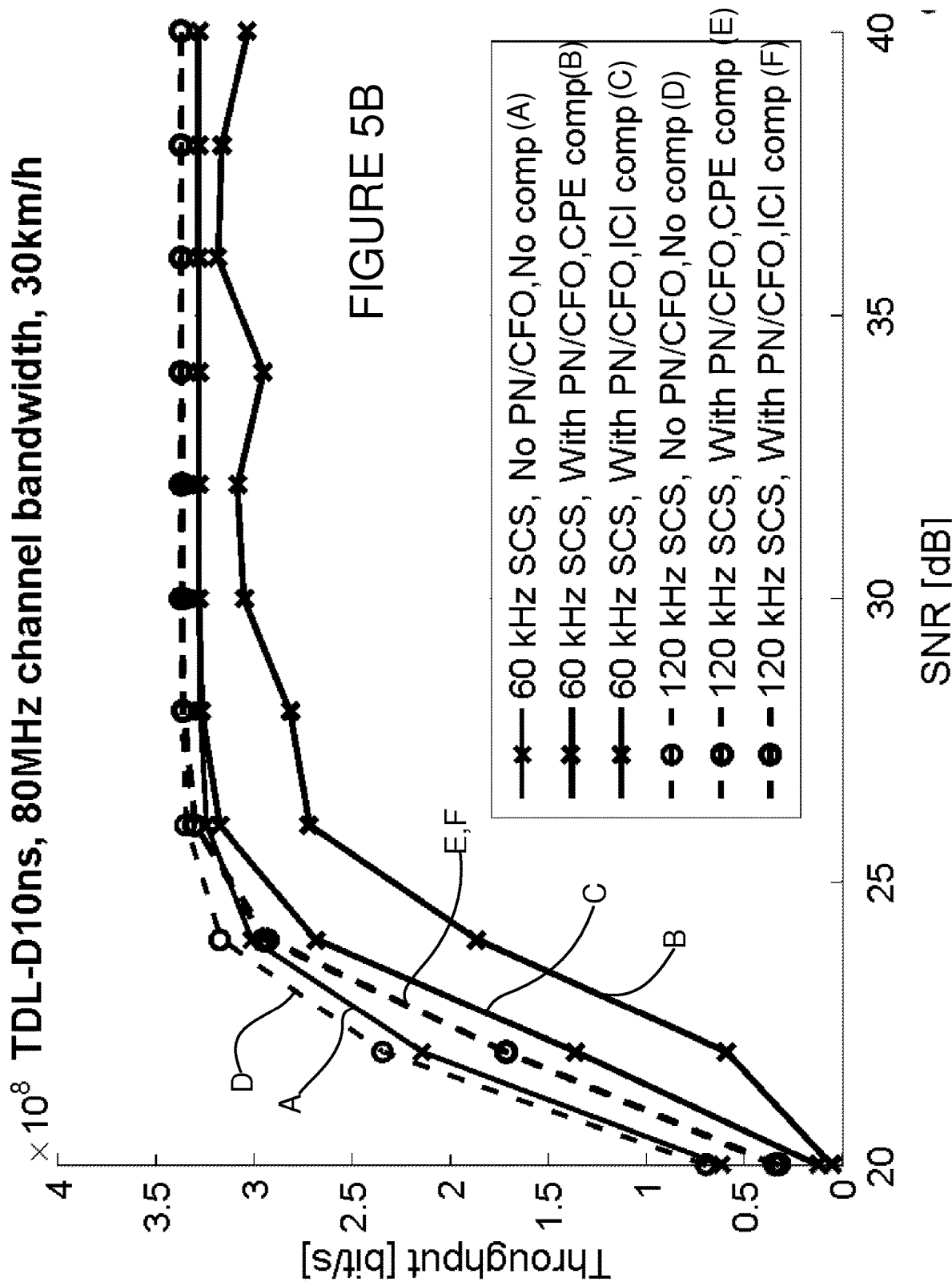

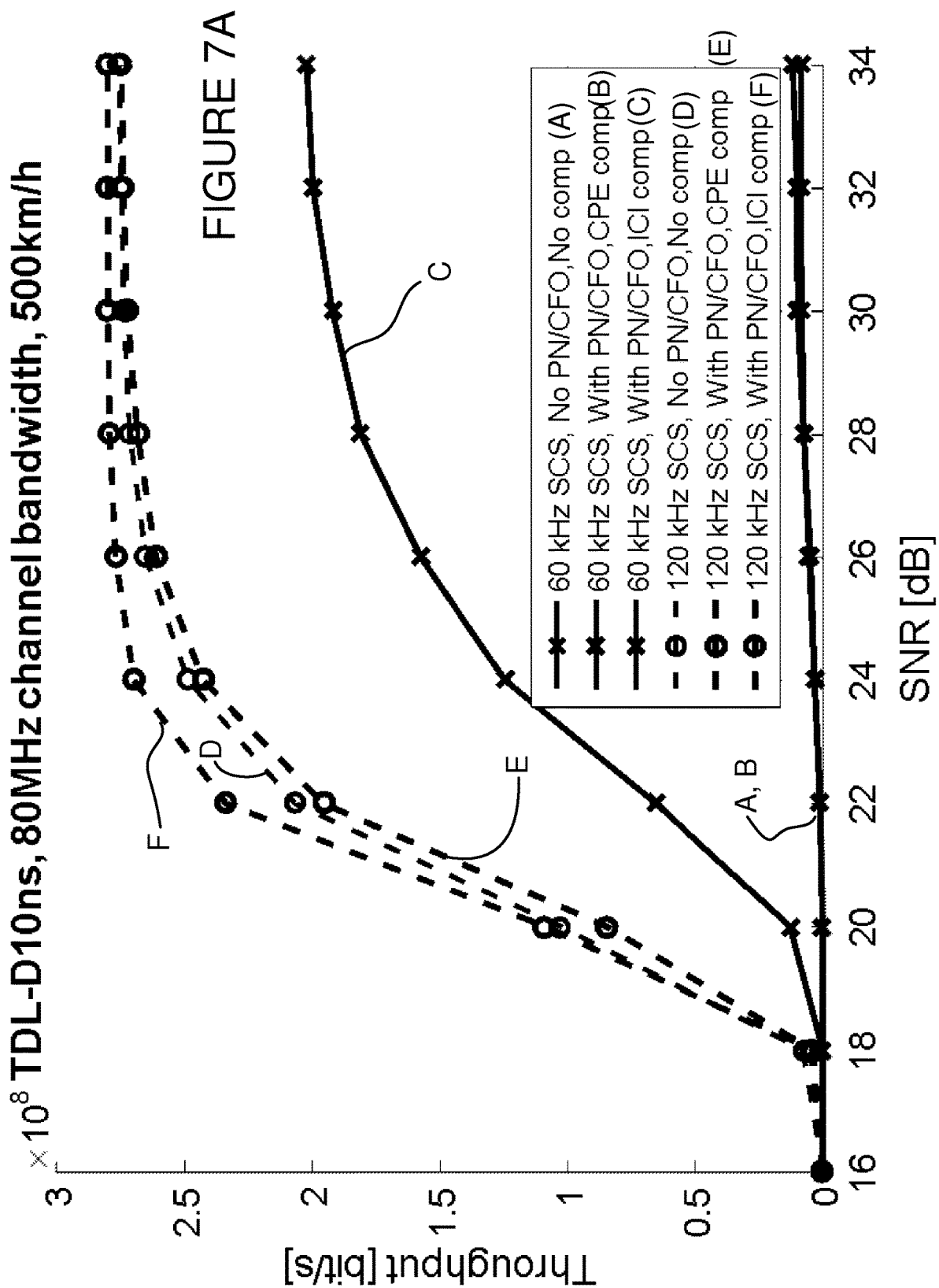

INTER-CARRIER INTERFERENCE COMPENSATION

RELATED APPLICATION

This application was originally filed as PCT Application No. PCT/FI2017/050569 filed Aug. 11, 2017.

FIELD

This specification relates methods and apparatuses for performing compensation of inter-carrier interference in received OFDM signals.

BACKGROUND

Modern wireless links are expected to provide high throughput wireless services for high velocity scenarios. One example of a high velocity scenario is the high-speed train (HST) scenario, which was evaluated for LTE in 3GPP TR 36.878 ("Study on performance enhancements for high speed scenario"). In this LTE evaluation, the maximum speed of trains was assumed to be 360 km/h.

For future networks, such as 5G, the typical assumption is that the maximum speed of trains is 500 km/h. Such velocities, coupled with the use of frequencies above 3 GHz, mean that the channel is rapidly changing due to Doppler phenomenon. Doppler phenomenon may affect the channel in different ways. For instance, it may cause a frequency offset on the strong line-of-sight (LOS) component, and it may also cause Doppler-induced inter-carrier interference (ICI), which results from the time-varying channel response within one OFDM symbol period. While it may be possible to pre-compensate for the frequency offset at the transmitter (e.g. using frequency synchronisation), this may not be possible with Doppler-induced ICI, which may require compensation at the receiver. In addition, at the higher frequencies used by modern wireless links (for instance, centimetre (cm) and millimetre (mm) bands, defined as frequency bands 3-30 GHz and 30-300 GHz, respectively), phase noise (PN) generated by local oscillators (LO) can result in phase-noise induced ICI which can become the dominating error source in the high signal-to-noise-ratio (SNR) region.

SUMMARY

In a first aspect, this specification describes a method comprising receiving an OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type. The method further comprises, for each of the plural blocks of subcarriers of the first type, estimating inter-carrier interference components, estimating inter-carrier interference components for the subcarriers of the second type using the inter-carrier interference components estimated for the plural blocks of subcarriers of the first type, and compensating for inter-carrier interference in the plural blocks of subcarriers of the second type using the inter-carrier interference components estimated for the subcarriers of the second type, thereby to generate plural compensated blocks of subcarriers of the second type.

The OFDM signal may be received at a receiving apparatus from a transmitting apparatus, wherein the receiving apparatus is moving relative to the transmitting apparatus, and wherein the estimated inter-carrier interference components result from the movement of the receiving apparatus relative to the transmitting apparatus.

The subcarriers of the blocks of subcarriers of the second type may be data subcarriers. Put another way, the subcarriers of the second type may carry data symbols.

The subcarriers of the blocks of subcarriers of the first type may be reference subcarriers, for instance pilot subcarriers. Put another way, the subcarriers of the first type may carry reference (e.g. pilot) symbols. Alternatively, the plural blocks of OFDM subcarriers of the first type may have a lower order modulation than do the plural blocks of OFDM subcarriers of the second type. In such implementations, the plural blocks of OFDM subcarriers of the first type may be control channel blocks. Put another way, they may be control information blocks transmitted in a control channel. In other implementations the plural blocks of OFDM subcarriers of the first type may have been be generated using a constrained-version of the symbol constellation used for generating the plural blocks of OFDM subcarriers of the second type.

Compensating for inter-carrier interference in the plural blocks of subcarriers of the second type using the inter-carrier interference components estimated for the subcarriers of the second type may comprise determining plural processing blocks based on the plural blocks of subcarriers of the signal, each processing block including at least one block of subcarriers and at least one subcarrier from at least one adjacent block of subcarriers, and, for each of the processing blocks, compensating for inter-carrier interference in the subcarriers of the processing block using the processing block and the inter-carrier interference components estimated for subcarriers that are included in the processing block. Adjacent processing blocks may overlap with one another in the frequency domain. The plural processing blocks may encompass the entire frequency allocation of the OFDM signal. Compensating for inter-carrier interference in the subcarriers of the processing block may comprise transforming the processing block into the time domain, transforming the inter-carrier interference components estimated for subcarriers that are included in the processing block into the time domain, and using the transformed processing block and the transformed inter-carrier interference components to compensate for inter-carrier interference in the subcarriers of the processing block. Using the transformed processing block and the transformed inter-carrier interference components to compensate for inter-carrier interference in the subcarriers of the processing block may comprise performing a sample-wise division of the transformed processing block and the transformed inter-carrier interference components. The method may further comprise transforming, into the frequency domain, the result of the sample-wise division, identifying the compensated subcarriers from the frequency domain result of the sample-wise division, and aggregating the compensated subcarriers to produce the plural compensated blocks of subcarriers of the second type.

The method may further comprise processing, in the time domain, the transformed inter-carrier interference components estimated for the subcarriers that are included in the processing block prior to using the transformed processing block and the transformed inter-carrier interference components to compensate for inter-carrier interference in the subcarriers of the processing block. Processing the transformed inter-carrier interference components estimated for the subcarriers that are included in the processing block may comprise performing a least squares linear fit of the transformed inter-carrier interference components.

Estimating inter-carrier interference components for the subcarriers of the second type using the inter-carrier interference components estimated for the plural blocks of subcarriers of the first type may comprise interpolating the inter-carrier interference components estimated for two sequential blocks of subcarriers of the first type to obtain the inter-carrier interference components of the subcarriers of the second type, which have frequencies between the frequencies of the two sequential blocks of subcarriers of the first type. Alternatively, estimating inter-carrier interference components for the subcarriers of the second type using the inter-carrier interference components estimated for the plural blocks of subcarriers of the first type may comprise using a Wiener filter that is configured based on the time and frequency correlation properties of the received OFDM signal inter-carrier interference components estimated for the plural blocks of subcarriers of the first type to estimate the inter-carrier interference components for the subcarriers of the second type.

The method may comprise compensating for inter-carrier interference in the plural blocks of subcarriers of the first type using the inter-carrier interference components estimated for the subcarriers of the first type, thereby to generate plural compensated blocks of subcarriers of the first type.

In a second aspect, this specification describes apparatus configured to perform any method as described with reference to the first aspect.

In a third aspect, this specification describes computer-readable instructions which, when executed by computing apparatus, may cause the computing apparatus to perform any method as described with reference to the first aspect.

In a fourth aspect, this specification describes apparatus comprising at least one processor and at least one memory including computer program code. When the computer readable code is executed by the at least one processor it causes the apparatus to receive an OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type, for each of the plural blocks of subcarriers of the first type, to estimate inter-carrier interference components, to estimate inter-carrier interference components for the subcarriers of the second type using the inter-carrier interference components estimated for the plural blocks of subcarriers of the first type, and to compensate for inter-carrier interference in the plural blocks of subcarriers of the second type using the inter-carrier interference components estimated for the subcarriers of the second type, thereby to generate plural compensated blocks of subcarriers of the second type.

The apparatus of the fourth aspect may be further configured, by way of the computer program code being executed by the at least one processor, to perform any of the operations described with reference to the method of the first aspect.

In a fifth aspect, this specification describes a computer-readable medium having computer-readable code stored thereon, wherein the computer readable code, when executed by at least one processor, causes performance of at least: receiving one or more OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type; for each of the plural blocks of subcarriers of the first type, estimating inter-carrier interference components; estimating inter-carrier interference components for the subcarriers of the second type using the inter-carrier interference components estimated for the plural blocks of subcarriers of the first type; compensating for inter-carrier interference in the plural blocks of subcarriers of the second type using the inter-carrier interference components estimated for the subcarriers of the second type, thereby to generate plural compensated blocks of subcarriers of the second type. The computer readable code stored on the computer readable medium of the fifth aspect may, so when executed by the least one processor, causes performance of any of the operations described with reference to the method of the first aspect.

In a sixth aspect, this specification describes apparatus comprising: means for receiving one or more OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type; means for, for each of the plural blocks of subcarriers of the first type, estimating inter-carrier interference components; means for estimating inter-carrier interference components for the subcarriers of the second type using the inter-carrier interference components estimated for the plural blocks of subcarriers of the first type; and means for compensating for inter-carrier interference in the plural blocks of subcarriers of the second type using the inter-carrier interference components estimated for the subcarriers of the second type, thereby to generate plural compensated blocks of subcarriers of the second type. The apparatus of the sixth aspect may further comprise means for performing any of the operations described with reference to the method of the first aspect.

BRIEF DESCRIPTION OF THE FIGURES

For better understanding of the present application, reference will now be made, by way of example only, to the accompanying drawings in which:

FIGS. 5A, 5B, 6A, 6B, 7A and 7B are graphs showing throughput against signal to noise ratio (SNR) in order to illustrate the benefits of the inter-carrier interference compensation methods described herein;

DETAILED DESCRIPTION

Figure 1:
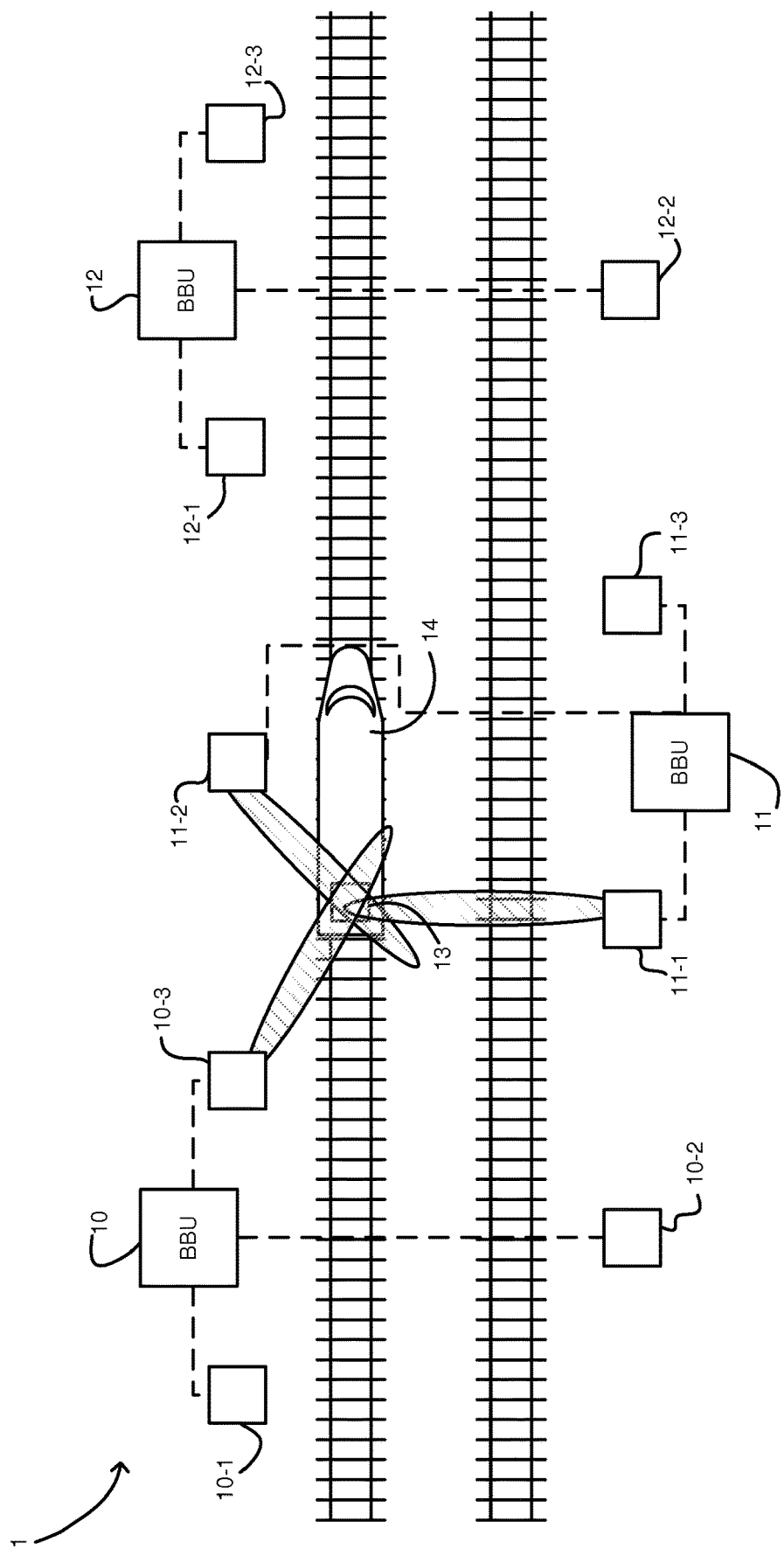
FIG. 1 is an example of a wireless communication system 1 in which the inter-carrier interference compensation methods described herein may be implemented.

In the description and drawings, like reference numerals refer to like elements throughout.

The inter-carrier interference compensation methods described herein are configured to compensate for phase noise-induced ICI and Doppler-induced ICI, both of which may occur in wireless communications utilising high frequency bands and/or involving entities travelling at high relative speeds. As will be appreciated from the below description, the methods described herein obtain inter-carrier interference estimates in a non-iterative manner by using specific blocks of subcarriers in an OFDM signal (referred to herein as subcarriers of the first type) to determine ICI components for other blocks of subcarriers in the signal (referred to herein as subcarriers of a second type). In some examples, the OFDM signal may be at least part of a 5G (NR) frame.

FIG. 1 is an example of a wireless communication system 1 in which the inter-carrier interference compensation methods described herein may be implemented.

The system 1 includes one or more network-side communications apparatuses 10, 11, 12 and one or more UE-side communications apparatuses 13. The UE-side and the network-side communications apparatuses are moveable relative to one another. Specifically, in this example, the UE-side communications apparatus 13 is mounted on a vehicle 14, which in this example is a train. The UE-side and network side communications apparatuses 10, 11, 12, 13 may be configured for bidirectional communication with each other. The direction from the network side communications apparatuses 10, 11, 12 to the UE-side communications apparatuses 13 may be referred to as the "downlink" direction, while the reverse direction may be referred to as the uplink direction.

As will be appreciated from the below description, the methods described herein can be used in both the downlink and uplink directions as long as the transmitted signal (on the uplink or downlink, as appropriate) includes blocks of subcarriers of the first type (as described below) to enable estimation of the inter-carrier interference components affecting the signal. Moreover, the methods can be used in single stream and multi-stream transmissions (e.g. MIMO). In addition, the subcarriers of the first type can be overlapping both in time and frequency. This property can be used to reduce the overhead resulting from the presence of the subcarriers of the first type.

In this example, each of the network-side communications apparatuses 10, 11, 12 includes a baseband unit (BBU) 10-1, 11-1, 12-1 and one or more remote radio heads (RRH) 10-2 to 10-4, 11-2 to 11-4, 12-2 to 12-4. However, other arrangements may be used. Although not illustrated in FIG. 1, in order to provide a high probability of a line-of-sight channel being established, the remote radio heads 10-2 to 10-4, 11-2 to 11-4, 12-2 to 12-4 may be positioned at the same (or a greater) height as the UE-side communications apparatus 13, for instance level with the top of the vehicle 14.

The UE-side communications apparatus 13 may act as a relay for one or more user equipments (UEs) in the vehicle 14. The network-side communications apparatus 10, 11, 12 may view the UE-side communications apparatus 13 as a single device, and the sharing or aggregation of per user traffic within the vehicle may be relayed through the UE-side communications apparatus 13.

In some implementations, the wireless communications system 1 may be acting as a single frequency network, in which all network-side communications apparatuses 10, 11, 12 participating in the communication transmit the same signal.

The wireless communications system 1 may, in some examples, be capable of supporting network side time alignment, in addition to line-of-sight component Doppler shift pre-compensation. This may allow the transmitted signals to be received by the receiving apparatus at the same time, which may in turn reduce the effective channel delay spread. However, due to practical limitations, for instance, estimation errors in the time alignment, the effective channel delay spread may not be eliminated entirely.

The presence of effective channel delay spread of the propagation channel can reduce viability of higher subcarrier spacings. As a consequence, the apparatuses 10, 11, 12, 13 of the system 1 may be configured to transmit OFDM signals with subcarrier spacing which is as small as required in order to provide sufficiently high throughput. For instance, the apparatuses 10, 11, 12, 13 may be configured to use subcarrier spacings of 60 kHz or 120 kHz. However, it should be appreciated that the methods described herein are not limited to these specific spacings.

The transmitting entity in a particular communication (that is the transmitting one of the network-side and UE-side communications apparatuses 10, 11, 12, 13) is configured to transmit one or more OFDM signals, including plural blocks of OFDM subcarriers of a first type and plural blocks of OFDM subcarriers of a second type. The OFDM signal may comprise one more OFDM symbols.

The subcarriers of each block of OFDM subcarriers of the first type are allocated to contiguous frequencies. In addition, the plural blocks of subcarriers of the first type may be distributed, in the frequency domain, amongst the plural blocks of subcarriers of the second type. That is to say, each block of subcarriers of the first type may be adjacent, in frequency, to a block of subcarriers of the second type. Put in other words, each block of subcarriers of the first type may be separated, in frequency, from the next block of subcarriers of the first type by one or more blocks of subcarriers of the second type. The blocks subcarriers of the first type may be regularly spaced.

In the examples described herein, the "type" of the subcarriers may be defined by the type of information that is carried by the subcarrier. For instance, in some specific implementations, the blocks of subcarriers of the first type may carry known reference information (these may be referred to as known reference blocks, or simply reference blocks) and the blocks of subcarriers of the second type may carry unknown data (e.g. user data (these may be referred to as data blocks). In such examples, the blocks of subcarriers of the first type may be pilot blocks, in which the subcarriers carry pilot data, and the blocks of subcarriers of the second type may be data blocks.

In other examples, the "type" of the subcarriers may be dependent on another characteristic of the subcarrier. For instance, the type may be dependent on the modulation and coding scheme (MCS) that is applied to the subcarrier. More specifically, the subcarriers of the first type may carry lower order modulation symbols than do the subcarriers of the second type. In other examples, the subcarriers of the first type may contain data symbols which are constructed from a limited set of constellation points available in the symbol constellation used for subcarriers of the second type. Using a limited set of available constellation points may be referred to as using constrained symbol alphabet. Implementations such as this are described in more detail towards the end of the specification.

Figure 2:
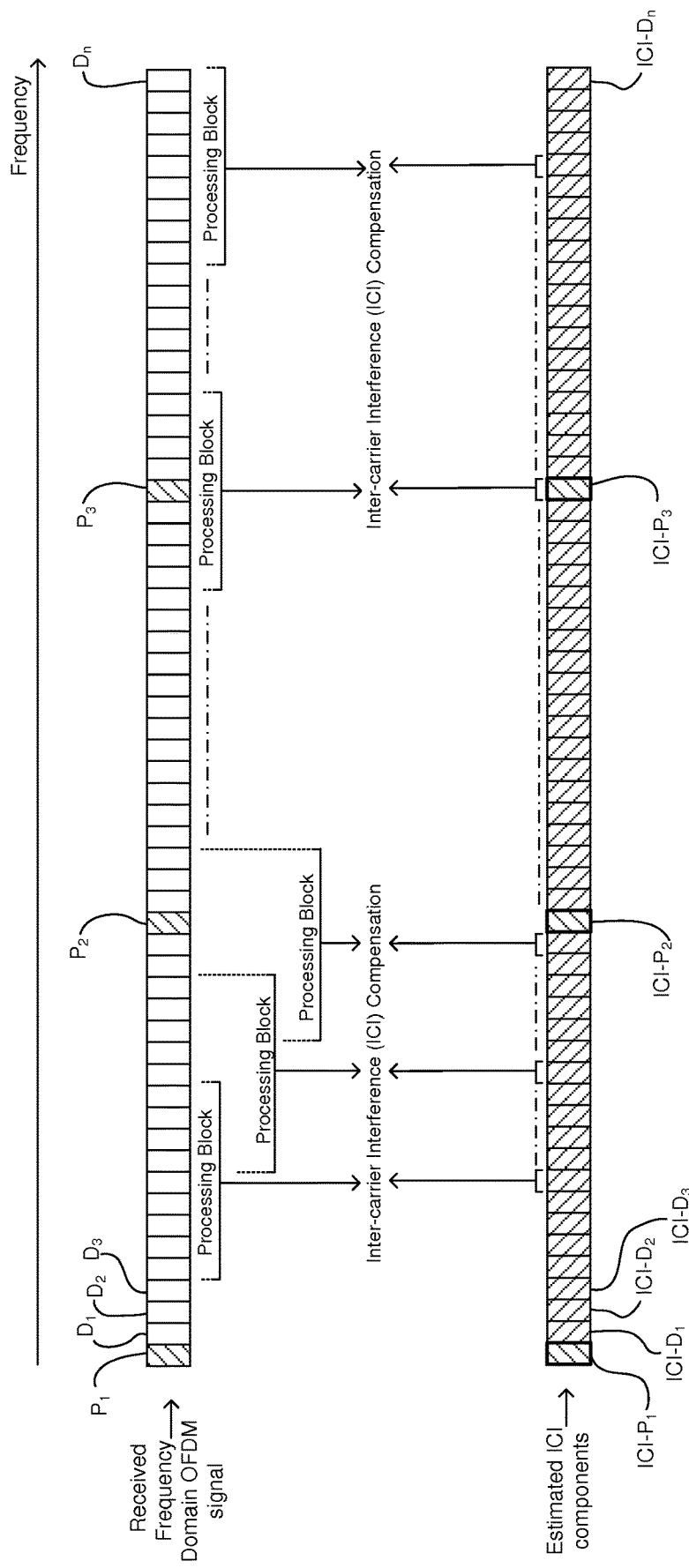
FIG. 2 illustrates the format of an OFDM signal comprising plural blocks of subcarriers of the first and second types. It also illustrates how the blocks of subcarriers may be processed when performing inter-carrier interference compensation.

FIG. 2 illustrates an example of a frequency domain representation of a received OFDM signal. In this example, plural reference blocks $P_1$, $P_2$, $P_3$ of subcarriers the first type allocated to contiguous frequencies are regularly spaced throughout the bandwidth of the channel, which is otherwise filled by data blocks of subcarriers of the second type $D_n$.

Upon receipt of an OFDM signal, for instance as illustrated in FIG. 2, the receiving entity (that is the receiving one of the network-side and UE-side communications apparatuses 10, 11, 12, 13) is configured to estimate, for each of the blocks of subcarriers of the first type (e.g. the reference blocks $P_1$, $P_2$, $P_3$), the inter-carrier interference components affecting the subcarriers of the block.

The blocks of sub-carriers of the first type $P_1$, $P_2$, $P_3$ may each be at least two subcarriers in width. However, the inventors have found that, to provide a reasonable estimation of k ICI components, blocks of at least 2k+1 subcarriers of the first type may be utilised. In general, using larger blocks of subcarriers of the first type may provide diversity, which provides an improvement in the quality of estimation of the inter-carrier interference components, with the cost of increased overhead. In evaluations performed by the inventors, which took into account 5G system design, blocks of 12 subcarriers (1 physical resource block (PRB)) in width were used. This is because blocks of 12 subcarriers contain a sufficient amount of subcarriers and, in the system level, managing PRB-wise blocks may be simpler. However, it should be understood that other block widths for the blocks of subcarriers of the first type may also be used, with the optimal width being dependent on the optimal operation point for a particular system.

Using blocks of one PRB in width has been found to provide a good compromise between performance and overhead. The overhead may be further tuned by adapting the granularity of the blocks, in other words how often they are repeated across the channel.

The granularity of the blocks of subcarriers of the first type within the channel may also be dependent on the effective channel delay spread. This is because the inter-carrier interference may change as a function of frequency as a result of the effective channel delay spread. As such, inter-carrier interference components estimated for a particular frequency sub-range of the channel may only be useful for estimating inter-carrier interference components for subcarriers of the second type having frequencies near to that sub-range. Thus, for a higher channel delay spread, a higher granularity may be utilised, and vice versa.

The granularity of the blocks of the first type may be dependent on the subcarrier spacing. More specifically, a lower granularity may be used with a larger subcarrier spacing and vice versa. For instance, a block granularity of once every 20 physical resource blocks may be used for a subcarrier spacing of 60 kHz, whereas for a subcarrier spacing of 120 kHz, a block granularity of once every 10 physical resource blocks may be used. Both these granularities result in a separation between reference blocks of 14.4 MHz. These granularities and subcarrier spacing combinations may be well suited for the digital tapped delay ions line of sight channel (for which the 0.5 correlation coherence bandwidth is 20 MHz and the 0.9 correlation coherence bandwidth is 2 MHz) that has been agreed by 5G working groups for the high speed rain (HST) scenario (see Table A.2.1-2 in 3GPP TR 38.802 and related channel model definitions in 3GPP TR-38.900 V14.2.0).

Next, the receiving entity uses the inter-carrier interference components estimated for the plural blocks of subcarriers of the first type to estimate inter-carrier interference components for the subcarriers of the second type (e.g. the sub-carriers of the data blocks). This may be performed by interpolating the inter-carrier interference components estimated for the plural blocks of subcarriers of the first type to estimate the inter-carrier interference components for the intervening frequencies of the subcarriers of the second type (e.g. the subcarriers of the data blocks). In other examples, a Wiener filter-based approach may be used. For instance, a standard frequency correlation-based Wiener filter may be utilised (e.g. as described in Hoeher et al. "*Two-dimensional pilot-symbol-aided channel estimation by Wiener filtering*", IEEE International Conference on Acoustics, Speech, and Signal Processing, 1997. ICASSP-97, 1997). This standard approach may be sufficient. However, for improved results, the correlation value used in the Wiener design may take into account the effect of both frequency and time correlation. This is because the channel changes during the OFDM symbol and therefore utilising time correlation in the estimation (and not just the frequency correlation) may improve the estimation. Knowledge of the time-frequency correlation properties of the channel may be utilised for generation of the Wiener filter. This may be approximated during channel estimation and may be reused for generating the Wiener filter. In general, the time-frequency correlation properties of a channel depend on the channel delay spread and either the relative velocity between the transmitting and receiving entities or the relative velocity of the scattering environment around the transmitting and receiving entities.

FIG. 2 also illustrates the inter-carrier interference components ICI-$P_1$, ICI-$P_2$, ICI-$P_3$ corresponding to each of the blocks of subcarriers of the first type (e.g. reference blocks). In addition, it illustrates the inter-carrier interference components ICI-$D_{1\ldots n}$ estimated for each of the blocks of sub carriers of the second type (e.g. data blocks) on the basis of the inter-carrier interference components corresponding to the blocks of subcarriers of the first type.

Subsequently, the receiving entity uses the inter-carrier interference components ICI-$P_1$, ICI-$P_2$, ICI-$P_3$, ICI-$D_{1\ldots n}$ to perform inter-carrier interference compensation in respect of the plural blocks of subcarriers of the second type (and optionally also in respect of the blocks of subcarriers of the first type) in the received OFDM signal, thereby to generate plural compensated blocks of subcarriers of the first type and the second type.

As will be discussed in more detail below, performing compensation for inter-carrier interference in the plural blocks of subcarriers of the second type (e.g. the data blocks) may include determining one or more processing blocks based on the received OFDM signal. Each of the processing blocks may include at least one block of subcarriers (either the first or second type) and at least one subcarrier from at least one adjacent block of subcarriers. Each of the processing blocks may overlap with one or more adjacent processing blocks by at least one subcarrier. Together the processing blocks may encompass the whole bandwidth of the OFDM signal. FIG. 2 illustrates exemplary processing blocks each comprising plural adjacent blocks surrounding a given one of the blocks of subcarriers. The overlap between processing blocks is also evident.

The size of the processing block may be dependent on the compensation performance and complexity, and also on the environment as defined by the RMS delay spread, Doppler, and time-frequency correlation. In theory, the more subcarriers that are included in the processing block, the more inter-carrier interference components it is possible to remove. On the other hand, including more subcarriers in the processing blocks increases the implementation complexity because the Fourier transform sizes increases with processing block size. In addition, the quality of the estimated ICI components that are used for performing compensation of the processing block degrades with the distance in the frequency domain. It will therefore be appreciated that the processing block size may be selected based on a balance between performance, complexity and the communications environment.

The number of processing blocks may depend on the number of blocks of subcarriers that are collected from each processing block following compensation. For instance, if one block of subcarriers is collected from each processing block following compensation, the number of processing blocks corresponds to the number of blocks of subcarriers in the signal. If, however, two (or more) blocks of subcarriers are collected from each processing block, the number of processing blocks is reduced by a factor of the number of collected blocks of subcarriers. For instance, for N blocks of subcarriers in the signal, collecting two compensated blocks of sub-carriers from each processing block requires a total of N/2 processing blocks to be generated.

Subsequently, for each of the processing blocks, the inter-carrier interference components corresponding to the desired block(s) of subcarriers in that processing block is used to compensate for inter-carrier interference affecting the subcarriers which make up the processing block. More specifically, the inter-carrier interference components corresponding to the centre subcarrier block(s) in the processing block may be used. For instance, if subcarrier blocks numbers 1 to 5 are included in a particular processing block and one subcarrier block is to be collected from the compensated processing block, inter-carrier interference components corresponding to subcarrier block 3 may be used in the compensation. If, however, more than one subcarrier block is to be collected from the processing block, a combination (for instance, a mean or some other combination) of the inter-carrier interference components corresponding to the subcarrier blocks which are to be collected is used.

As will be discussed in more detail below, compensating for inter-carrier interference in the subcarriers of the processing blocks may further comprise transforming the processing block and the corresponding inter-carrier interference components into the time domain. Subsequently, sample-wise division of the transformed processing block by the transformed inter-carrier interference components may be performed.

The results of the sample-wise division for each processing block are then transformed into the frequency domain. The compensated blocks of subcarriers (e.g. one or more physical resource blocks) from each compensated processing block are then collected and aggregated. The result is an inter-carrier interference-compensated representation of the received OFDM signal.

Collection and aggregation may comprise collecting only the desired subcarrier block(s) from each compensated processing block. The desired subcarrier blocks collected from each frequency block may then be aggregated into their correct places in the frequency domain to generate the inter-carrier interference-compensated representation of the received OFDM signal.

In other implementations, however, the compensated subcarriers from each processing block may be combined with the corresponding compensated subcarriers (in terms of frequency) from one or more other processing blocks to generate the generate the inter-carrier interference-compensated representation of the received OFDM signal. For instance, different weightings may be applied to different compensated subcarriers (or blocks of subcarriers) in each processing block. For instance, the weighting applied to the subcarrier (or block of subcarriers) may decrease with distance from the centre of the processing block. In an extreme example, a weighting of one may be applied to the desired (most central) blocks of subcarriers and a weighting of zero may be applied to the other blocks of subcarriers.

In some examples, prior to performing the sample-wise division, the inter-carrier interference components may be processed in the time domain. For instance, a least squares (LS) linear fit of the inter-carrier interference components in the time domain may be performed. This may be performed when Doppler-induced inter-carrier interference is the main source of error in the received OFDM signal. This is because the inventors have recognised that, in many cases in which Doppler-induced inter-carrier interference is the main problem, the channel change within one OFDM symbol is linear. Performance of this time domain processing may reduce the cyclic distortion caused by the periodic IFFT, which is used to transform the components into the time domain.

The processing of the inter-carrier interference components in the time domain may be omitted when phase noise-induced inter-carrier interference is the primary source of error.

In some examples, the compensation of the processing blocks may be performed in the frequency domain, based on the corresponding inter-carrier interference components, using frequency domain deconvolution. This may avoid the need to transform the processing blocks and inter-carrier interference components to the time domain (and the compensated blocks of subcarriers back to the frequency domain). However, use of sample-wise division in the time domain may be less computationally expensive than performing compensation in the frequency domain.

The above-described inter-carrier interference compensation methods will now be described in more detail with reference to FIGS. 3 and 4.

The inter-carrier interference compensation operations described with reference to FIGS. 3 and 4 assume that Doppler frequency offset has already been mostly mitigated (for instance, via pre-compensation at the transmitter). Also, inter-carrier interference compensation operations described below are based on an assumption that the time variation of the channel within OFDM symbol period causes ICI.

Figure 3:
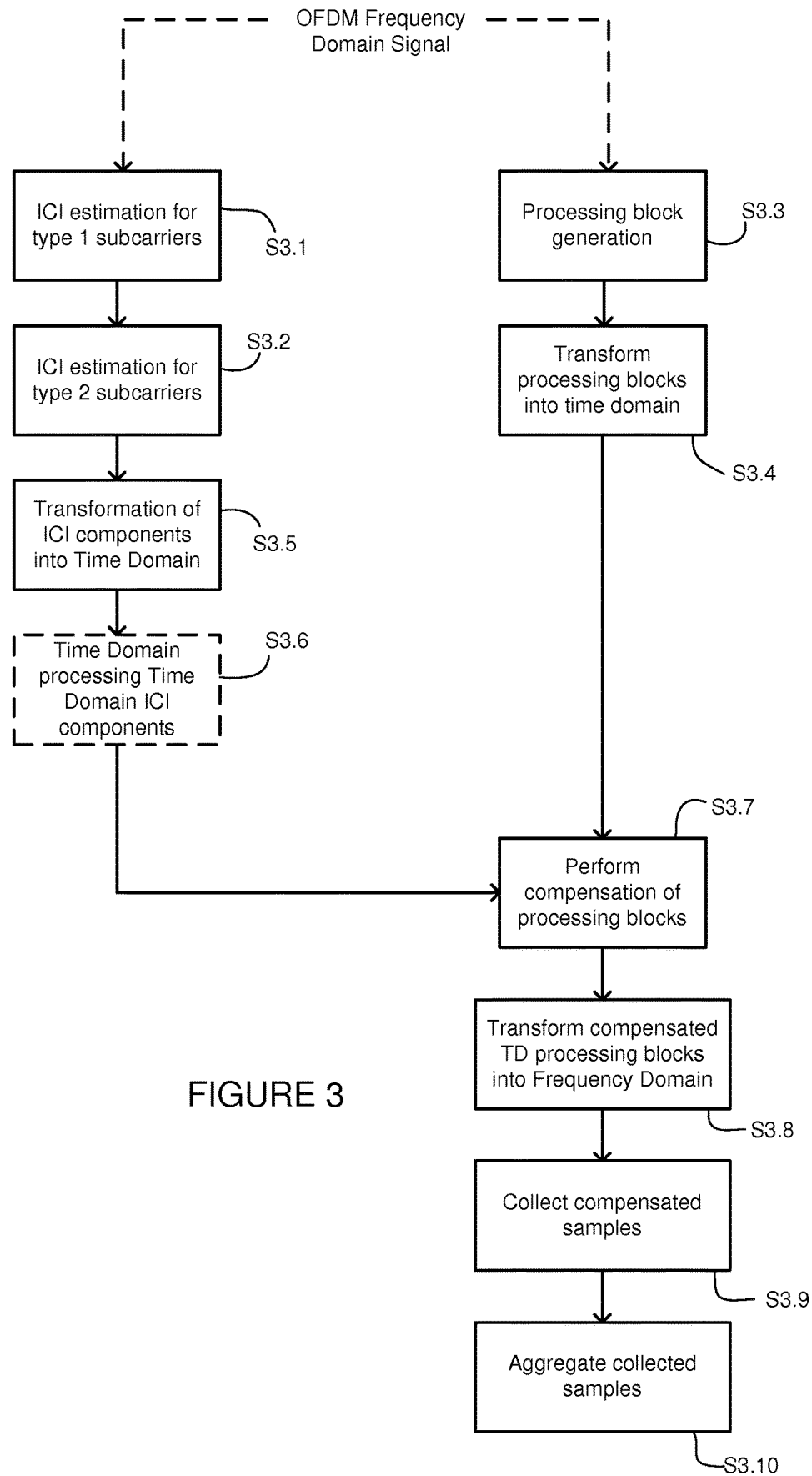
FIG. 3 is a flowchart illustrating various operations which may be performed when compensating for inter-carrier interference.

FIG. 3 is a flow chart illustrating various operations which may be performed by the receiving entity (e.g. one of the network side and UE-side communications apparatuses 10, 11, 12, 13 illustrated in FIG. 1) in order to perform inter-carrier interference compensation.

Figure 4:
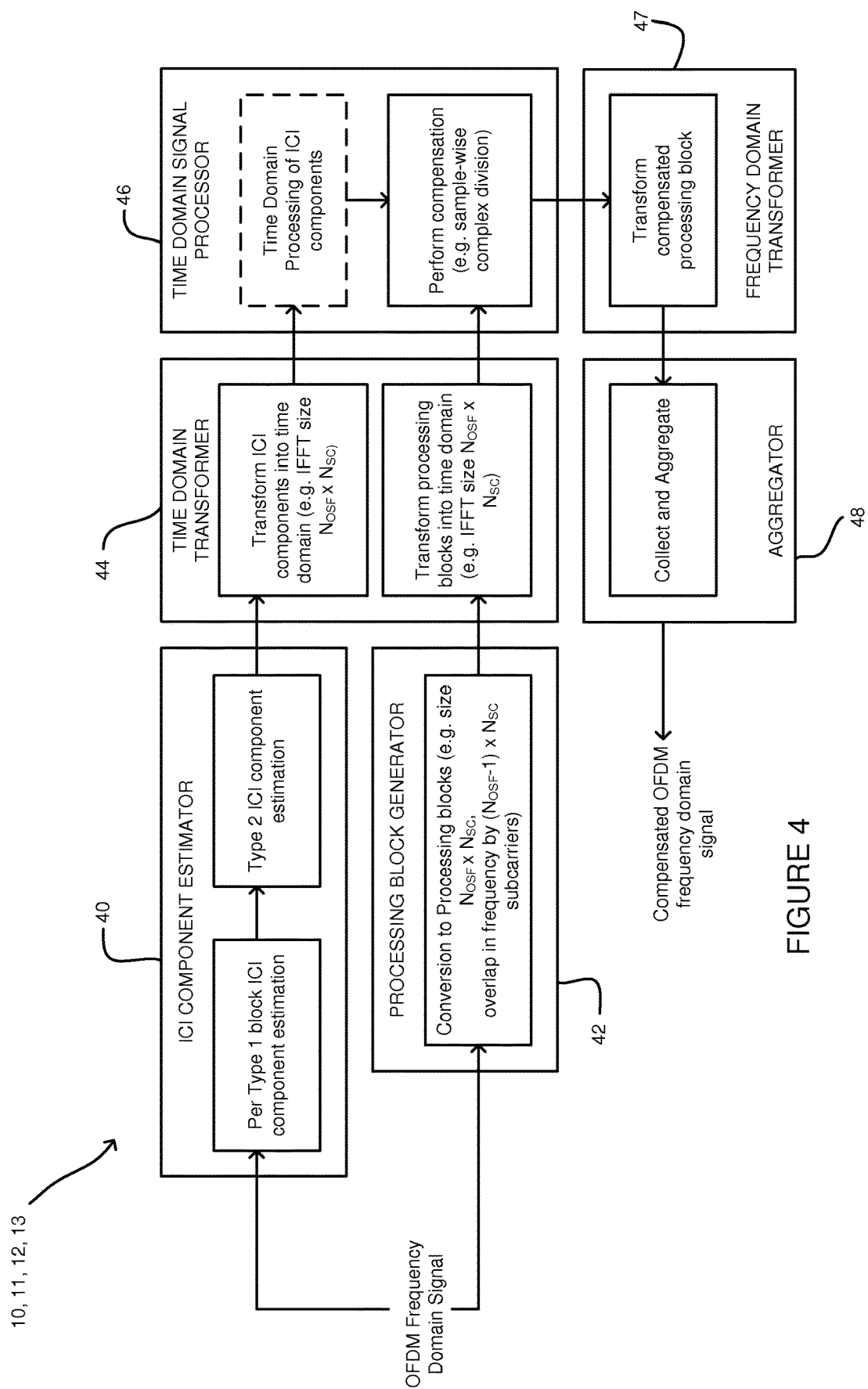
FIG. 4 is a schematic illustration of various functional blocks which may be utilised when performing inter-carrier interference compensation.

FIG. 4 is a schematic illustration showing various functional blocks which may be included in the network side and UE-side communications apparatuses 10, 11, 12, 13 to enable them to perform the operations of FIG. 3. As will be appreciated, the configuration of the apparatus 10, 11, 12, 13 depicted in FIG. 4 is illustrative only. As such, the apparatus 10, 11, 12, 13 may include functional blocks other than those shown in FIG. 4.

Estimating ICI Components for Blocks of First Type

In operation S3.1, the inter-carrier interference components corresponding to the blocks of subcarriers of the first type are estimated. This may be performed by the inter-carrier interference (ICI) component estimator 40 illustrated in FIG. 4.

The estimation of the inter-carrier interference components corresponding to the blocks of subcarriers of the first type (e.g. reference blocks, such as pilot blocks or lower order modulation blocks) may be performed on the following basis:

The demodulated received OFDM symbol corrupted by inter-carrier interference can be written as per Equation 1, below. More specifically, Equation 1 is an approximation for a narrow subcarrier block for which it is assumed that the channel response is approximately flat. For a flat (single tap in time) channel, the time changing response has a low pass nature frequency response. The sample wise time domain product with the desired signal x and the time varying channel response h(t) is modelled in frequency domain by the convolution between X and $H_t$.

$$R_k = \sum_{l=0}^{N-1} X_l H_l J_{k-l} + Z_k = X_k H_k J_0 + \sum_{l=0, l \ne k}^{N-1} X_l H_l J_{k-l} + Z_k, \quad \text{Equation 1}$$

$$k \in 0, \ldots, N-1$$

where $X_k$ is the transmitted symbol on subcarrier k, $H_k$ is the average channel response at subcarrier k, $J_{k-l}$ is the non-flat frequency response within the block of subcarriers of the first type that is caused by the time changing channel response over one OFDM symbol, $Z_k$ is the thermal noise (and interference) component at subcarrier k, and N is the number of subcarriers in the OFDM symbol (typically N=52). $J_o$ is the common phase error (CPE) term that rotates all symbols similarly.

In Equation 1, the inter-carrier interference components represented by J do not change. However, the actual inter-carrier interference error on top of each $X_k$ depends on the weighted sum $X_l * J_{k-l}$, with k not equal to 1.

In some examples, the inter-carrier interference components corresponding to the blocks of subcarriers of the first type may be performed after channel equalization is performed in respect of the received signal. For instance, if the quality of the channel estimation is good and the estimates are updated per OFDM symbol, then the channel equalization should be able to remove the CPE per OFDM symbol. In contrast, in the case of a front-loaded reference signal design, where a slot starts with a demodulation reference signal (DMRS), which is used to estimate channel and equalize all data symbols within a slot, the CPE has to be estimated and compensated per OFDM symbol based on some known pilots. When estimating and compensating CPE, a distributed layout of single subcarrier pilots is sufficient to obtain frequency diversity, and, because CPE term is the same over all subcarriers, the estimate can be averaged over all pilot subcarriers.

Typically, in the case of phase noise-induced inter-carrier interference, only a few components around the DC of the frequency power response of the phase noise are significant. The DC of the frequency power response of the phase noise is the absolute value of $J_o$ to the power of two. The same (that only a few components around the DC of the frequency power response of the phase noise are significant) can also be assumed for Doppler-induced inter-carrier interference if the time-variation within one OFDM symbol is not too great. If the time-variation within one OFDM symbol is greater, the resulting frequency domain impulse starts to spread, and so the number of frequency domain inter-carrier interference components that are required to be estimated increases. Put another way, the number of inter-carrier interference components that should be estimated in frequency domain depends on the rate of change of the time variation over one OFDM symbol.

If we assume that only u inter-carrier interference components around the DC are estimated by the receiving entity, the situation after channel equalization can be approximated to following simplified format:

$$R_k = \sum_{l=-u}^{u} X_{k-l} \tilde{H}_{k-l} J_l + Q_k = \sum_{l=-u}^{u} Y_{k-l} J_l + Q_k \quad \text{Equation 2}$$

where $\tilde{H}_k$ represents the residual channel estimation error after channel equalization, JI represents the inter-carrier interference for the subcarrier, and $Q_k$ is the noise term per subcarrier including the thermal noise and inter-carrier interference components outside the estimated subcarrier bin range [−u, u]. $Y_{k-l}$ is the product of $\tilde{H}_k$ (the residual channel estimation error after channel equalization) and $X_{k-l}$ (the transmitted symbol on the subcarrier).

Now, assuming that the neighbourhoods of subcarriers $k \in \{l_1, l_2, \ldots, l_p\}$: $p \ge 2u+1$ is known, a set of linear equations can be written as:

$$\begin{bmatrix} R_{l_1} \\ \vdots \\ R_{l_p} \end{bmatrix} = \begin{bmatrix} Y_{l_1+u} & \cdots & Y_{l_1-u} \\ \vdots & \ddots & \vdots \\ Y_{l_p+u} & \cdots & Y_{l_p-u} \end{bmatrix} \begin{bmatrix} J_{-u} \\ \vdots \\ J_u \end{bmatrix} + \begin{bmatrix} Q_{l_1} \\ \vdots \\ Q_{l_p} \end{bmatrix} \leftrightarrow R_p = \quad \text{Equation 3}$$

$$Y_{u,p} J_u + Q_p$$

Now, if it is assumed that the values of $Y_{u,p}$ are known, the least square solution can be obtained as:

$$\hat{J}_u = (Y_{u,p}{}^H Y_{u,p})^{-1} Y_{u,p}{}^H R_p \quad \text{Equation 4}$$

Although $Q_p$ is not visible in Equation 4, it should be appreciated that $R_p$ in Equation 4 includes the noise term $Q_p$.

Alternatively, the minimum mean square error (MMSE) estimate solution can be obtained as:

$$\hat{J}_u = R_{J_u,J_u} Y_{u,p}{}^H (Y_{u,p} R_{J_u,J_u} Y_{u,p}{}^H + R_{Q_p,Q_p})^{-1} R_p \quad \text{Equation 5}$$

where $R_{J_u,J_u}$ is the autocorrelation matrix of the inter-carrier interference process and $R_{Q_p,Q_p}$ is the autocorrelation matrix for the residual interference and noise.

From evaluations performed by the inventors, it has been noted that the accuracy of these correlation matrices is not critical, and that simple models based on free-running-oscillators or single tap Rayleigh fading channels may be used. Therefore, these correlation matrices (or a set of the correlation matrices) can be precomputed and stored to memory in order to avoid run-time evaluations of correlation matrices. As such, the receiving entity (either network-side 10, 11, 12 or UE-side 13) may store, or otherwise have access to, autocorrelation matrices of the inter-carrier interference process and the residual interference and noise.

To select the correct correlation matrices, the receiving entity may utilise an estimate of the relative velocity between the transmitting and receiving entities. There are several different mechanisms by which the relative velocity may be estimated, and which of these is used may not be crucial to performance of the inter-carrier interference compensation methods described herein. For instance, in the high speed train scenario, the UE-side communication apparatus 13 may obtain the estimate for its velocity from a location system (e.g. one based on GPS) or from the vehicle's odometer. Alternatively, if the Doppler frequency has not been pre-compensated at the transmitter, the Doppler frequency can be used to estimate the relative velocity. Another option for estimating the velocity is to use the interference power on top of pilot blocks to deduce the effective velocity.

In order to minimize the overhead resulting from the presence of the subcarriers of the first type (e.g. reference subcarriers) required to estimate the desired inter-carrier interference components, the transmitted OFDM signal may include one contiguous block of b≥4u+1 of subcarriers of the first type. Using the minimum number of subcarriers of the first type (i.e. 4u+1) provides a critical set of equations with an equal number of equations and unknowns.

In some implementations, the transmitted OFDM signal may include additional subcarriers of the first type (e.g. reference subcarriers) in order to increase the accuracy of inter-carrier interference estimation. This may be especially true with the least square solution of Equation 4, but may also improve the accuracy of estimation when MMSE (as per Equation 5) is used.

Assuming that the first subcarrier in the block of the first type has index n, the set of linear equations (based on the least squares approach of Equation 4) can be rewritten as:

$$\begin{bmatrix} R_{n+u} \\ \vdots \\ R_{n+b-u-1} \end{bmatrix} = \begin{bmatrix} Y_{n+2u} & \cdots & Y_n \\ \vdots & \ddots & \vdots \\ Y_{n+b-1} & \cdots & Y_{n+b-2u-1} \end{bmatrix} \begin{bmatrix} J_{-u} \\ \vdots \\ J_u \end{bmatrix} + \begin{bmatrix} Q_{n+u} \\ \vdots \\ Q_{n+b-u-1} \end{bmatrix} \leftrightarrow R_{n,u,b} = Y_{n,u,b} J_u + Q_{n,u,b}$$

Equation 6

In practice, the receiving entity does not have knowledge of $Y_{n,u,b}$. As such, the receiving entity uses the known (or hard detected) values $X_{n,u,b}$ of the blocks of the first type to solve the unknowns. For example, in the case of least square estimation, the set of linear equations solved by the receiving entity in order to estimate the inter-carrier interference components can be written as:

$$\hat{J}_u = (X_{n,u,b}^H X_{n,u,b})^{-1} X_{n,u,b}^H R_{n,u,b}$$

Equation 7

Similarly to as explained above with respect to Equation 4, although $Q_{n,u,b}$ is not visible in Equation 7, $R_{n,u,b}$ in Equation 7 includes the noise term $Q_{n,u,b}$.

In the case of MMSE, the set of linear equations solved by the receiving entity in order to estimate the inter-carrier interference components can be written as:

$$\hat{J}_u = R_{J_u J_u} X_{n,u,b}^H (X_{n,u,b} R_{J_u J_u} X_{n,u,b}^H + R_{Q_{n,u,b} Q_{n,u,b}})^{-1} R_{n,u,b}$$

Equation 8

Put another way, the receiving entity is configured to solve a set of linear questions to estimate a number, u, of inter-carrier interference components around the DC subcarrier of J indicated as $J_o$ in Equation 1. The receiving entity solves the linear equations based on the symbols carried by a number, b, of subcarriers in one or more contiguous blocks of the first type and the portion of the demodulated received OFDM signal corresponding to the subcarriers in the contiguous block. In the case of the MMSE approach, the receiving entity may additionally make use of stored autocorrelation matrices for the inter-carrier interference process and the residual interference and noise.

In some implementations, the receiving entity may use values of u=1 or u=2, and b=12. This may enable some degree of averaging, thus improving the estimate quality.

The output following performance of operation S3.1 may be inter-carrier interference components per block of subcarriers of the first type $\hat{J}_{u,r} \in [mi+o]: 0 \leq mi+o \leq N-1$. Here, o is the offset of the block of subcarriers of the first type from the first block of subcarriers in the signal, i is the interval between blocks of subcarriers of the first type, and m is an integer multiplier allowing blocks of subcarriers of the first type to cover the whole allocation.

Estimating ICI Components for Blocks of Second Type

In operation S3.2, the inter-carrier interference components corresponding to the blocks of subcarriers of the second type are estimated. This may also be performed by the inter-carrier interference component estimator 40 illustrated in FIG. 4.

After estimating the inter-carrier interference components per block of subcarriers of the first type, linear interpolation may be used to obtain inter-carrier interference component estimates for the other blocks of subcarriers (e.g. the data blocks) of the allocation. Alternatively, as mentioned above, Wiener-based frequency domain filtering may be utilised. This may provide better estimates and may also allow the blocks of subcarriers of the first type to be used to update channel estimates per OFDM symbol. This is particularly true if the frequency location of the blocks of subcarriers of the first type (e.g. pilot blocks) (index r) is varied per OFDM symbol by the transmitting entity.

The interpolator for estimating the inter-carrier interference components for the blocks of subcarriers of the second type may be designed so as to exploit the channel correlation properties. More specifically, the inter-carrier interference components correlate in frequency in similar manner as the amplitude response of the channel correlates. Therefore, an interpolator design which is based on the time-frequency correlation of the signal may be utilised.

Generation of Processing Blocks

In operation S3.3, the receiving entity generates the processing blocks (which may also be referred to as compensation blocks) based on the received OFDM signal. This may be performed by the processing block generator 42 of FIG. 4.

The term "processing block" may be understood to mean a block of subcarriers from the OFDM signal and its neighbourhood, in frequency terms. The neighbourhood may be understood to mean a number of subcarriers that are closest to the subject block of subcarriers whose inter-carrier interference with the subject block of subcarriers is to be removed by the compensation process.

The set of indices of the blocks of subcarriers in the received OFDM signal may be defined as $I_D \in [0, N-1]$, $|I_D|=N_{SC}$, where N is the number of blocks in the signal and $N_{SC}$ is the number of subcarriers in the block (so, when the block of subcarriers is 1 PRB, $N_{SC}=12$). The set of indices of the subcarriers in the neighbourhood of the subject block may be defined as $I_N \in [0, N-1]$, $|I_N|=(N_{OSF}-1)N_{SC}$, where $N_{OSF}$ is an oversampling factor.

The processing block may be the union of these indices $I_{PB}=I_D \cup I_N$. The cardinality (the number of subcarriers in the processing block) may be $|I_{PB}|=N_{OSF} N_{SC}$, with the indices for the subcarriers of the subject block and the neighbourhood subcarriers being non-overlapping $I_D \cap I_N = \emptyset$.

It will therefore be apparent that, when compensation is performed on a block-by-block basis (block in this sense means the blocks of the subcarriers of the received signal, rather than the processing blocks), the size of the processing block is dependent on the size of the blocks of subcarriers in the incoming signal and the oversampling factor. Also, when compensation is performed on a block-by-block basis, each processing block overlaps with the previous one by ($N_{OSF}-1)N_{SC}$ subcarriers.

In evaluations performed by the inventors, which are discussed below with reference to FIGS. 5A to 7B, an oversampling factor of 10 was used. However, as will be appreciated, the size of the oversampling factor is a trade-off between ICI mitigation quality and complexity. In some examples, the minimum oversampling factor may be 2. This may ensure that compensation for inter-carrier interference from subcarriers in at least one neighbouring block is performed.

The above example regarding the indices of the blocks of subcarriers is for the case in which one subcarrier block is collected per processing block. However, this may not necessarily be the case. For instance, in some examples, the number of compensated subcarriers collected from one processing block may not correspond to the size of one block of subcarriers. Instead, it may be an integer (or non-integer) multiple of the number of subcarriers in one subcarrier block.

Transformation of Processing Blocks into Time Domain

In operation S3.4, the receiving entity converts the processing blocks (those generated in S3.3) into the time domain. This may be performed by the time domain transformer 44 of FIG. 4.

After generating the processing blocks, each processing block is converted to the time domain using an inverse discrete Fourier transform (IDFT), for instance an inverse fast Fourier transform (IFFT). The size of the IDFT may correspond to the size (in subcarriers) of the processing block. Continuing the example above, which assumes block-by-block compensation, the size of the IDFT may be $N_{OSF}N_{SC}$.

Transformation of ICI Components into Time Domain

In operation S3.5, the receiving entity converts the estimated frequency domain inter-carrier interference components (those estimated in both S3.1 and S3.2) into the time domain. This may be performed by the time domain transformer 44 of FIG. 4.

The transformation into the time domain may be performed using an inverse Discrete Fourier transform (IDFT), such as an IFFT. The IDFT may have a size which corresponds to the size of the processing blocks (e.g. $N_{OSF}N_{SC}$). Using equal transform (IDFT) sizes in each of S3.5 and S3.4 may serve to minimize processing complexity.

The time domain transformer may output plural time domain representations, each based on the inter-carrier interference components corresponding to a respective processing block.

Processing of ICI Components in Time Domain

As mentioned above, in some examples, the receiving entity may, in operation S3.6, perform processing of the time domain representations of the inter-carrier interference components (as generated in operation S3.5). Such processing may be performed by the time domain signal processor 46 of FIG. 4.

More specifically, when the Doppler induced inter-carrier interference is the main source of error, the receiving entity may perform a least squares (LS) linear fit in respect of each of the time domain time domain representations output by the time domain transformer 44. This is because the inventors have recognised that, in most cases where Doppler-induced ICI the main problem, the channel change within one OFDM symbol is typically linear.

In some examples, operation S3.6 may be omitted, for instance when performance degradation is dominated by phase noise-induced ICI.

ICI Compensation

In operation S3.7, inter-carrier interference compensation is performed. This may be performed on the basis of the time domain representations of the ICI components (those output by S3.5 or S3.6) and the time domain representations of the processing blocks (as out by S3.4). The inter-carrier interference compensation may be performed by the time domain signal processor 46 of FIG. 4.

The inter-carrier interference compensation may be performed in the time domain by a sample-wise division. The division is assumed to be a sample-wise operation over the vectors and may be represented as:

$$t_{comp,a} = \frac{IFFT(t_{PB,a})}{IFFT(t_{ICI,a})}$$

where $\alpha$ is block index, $\alpha \in [0, N_B-1]$, $N_B$ is the maximum number of processing blocks in the specific allocation of the OFDM signal, $t_{ICI,\alpha}$ represents the time domain representation of the ICI components corresponding to a given block $\alpha$, $t_{PB,\alpha}$ represents the time domain representation of the corresponding processing block, and $t_{comp,\alpha}$ is the compensated time domain processing block.

The output of operation S3.7 is a series of compensated time domain representations of respective processing blocks, $t_{comp,\alpha}$.

Although it may be omitted in some implementations, in other implementations, inter-carrier interference compensation may also be performed in respect of the subcarriers of the first type (and not just the second type). In such implementations, processing blocks may be generated in which the blocks of the subcarriers of the first type are the "desired/central" blocks. The ICI components estimated for those blocks of subcarriers may then be used to perform inter-carrier interference compensation in the manner described above.

Subsequent Operations

Next, in operation S3.8, the compensated time domain representations of respective processing blocks, $t_{comp,\alpha}$, are transformed back into the frequency domain, for instance using a discrete Fourier transform (DFT), for instance a Fast Fourier transform (FFT). This may be performed by a frequency domain transformer 47 as illustrated in FIG. 4.

In operation S3.9, the desired block-wise (e.g. PRB-wise) subcarriers from the set of indices $I_{D,\alpha}$ are collected. For instance, for a processing block of index a, $I_{D,\alpha}$ may represent the set of subcarriers of the desired subcarriers (i.e. those for which ICI is being compensated) and the set $I_{N,\alpha}$ may represent the neighbourhood, which includes interfering subcarriers whose contribution to the ICI that is being removed. The subcarriers in the set $I_{N,\alpha}$ may not be of interest, since those subcarriers may be compensated using other processing blocks and are collected from those blocks.

Finally, in operation S3.10, the block-wise sample sets (that is the collected subcarriers from each processing block) are aggregated to generate properly-sized ICI compensated representation of the incoming OFDM signal.

Operations S3.9 and S3.10 may be performed by the aggregator 48 as illustrated in FIG. 4.

Other Implementations

Time Domain ICI Estimation

In the example process described with reference to FIG. 3, the estimation of the ICI components for the blocks of subcarriers of the second type is performed in the frequency domain. However, in other examples, this estimation may be performed in the time domain.

For instance, the ICI component estimation for the subcarriers of the second type (operation S3.2 in FIG. 3) may be performed after operation S3.5. In such an example, operation S3.5 may comprise transformation of the ICI components for subcarriers of the first type into the time domain. Further, the time domain processing of ICI components of operation S3.6 (e.g. performance of a least squares linear fit) may be performed in respect of only the ICI components for the subcarriers of the first type. The estimation of the ICI components for the subcarriers of the second type (operation S3.2) may then be performed after operation S3.6, using the time domain processed ICI components for the subcarriers of the first type.

When the ICI component estimation for the subcarriers of second type is performed in the time domain, the time domain responses of the ICI components between the ICI components estimated for the subcarriers of first type are interpolated. For instance, if there are 10 subcarrier blocks and ICI estimates for block indices 3 and 8 have already been determined (as blocks 3 and 8 include subcarriers of the first type), the first samples of the time domain representation of the ICI estimates for subcarrier blocks 3 and 8 may be used. Specifically, the receiving entity may use linear interpolation such that a line that passes through the values observed in blocks 3 and 8 is generated, with the values of this line at subcarrier blocks 1, 2, 4, 5, 6, 7, 9, and 10, providing the time domain ICI estimates for these subcarrier blocks indices. By repeating this process for all processing blocks in the signal, a full time domain representation of the ICI components may be obtained.

In examples in which linear fit processing has been performed in respect of the ICI components estimated for the blocks of subcarriers of the first type, it may be sufficient to interpolate only the first and last sample of the time domain representation, since the start and end points define the line passing through them. The time domain estimates for the ICI component of the blocks of sub carriers of the second type may then be obtained using that line.

Using Groups of PRBs

In the examples described above, the blocks of subcarriers of the OFDM signal, based on which the inter-carrier interference compensation is performed, may be one physical resource block in size. However, in other examples, in order to reduce the processing complexity, inter-carrier interference compensation may be performed on the basis of blocks of subcarriers which comprise plural physical resource blocks. In such examples, the inter-carrier interference estimates and the processing blocks are defined per group of physical resources blocks. The number of physical resource blocks in the group may be dependent on the specific implementation.

ICI Estimation During Channel Estimation

In the examples described above, the ICI compensation is performed after equalisation of the incoming OFDM signal. However, in other examples, the ICI compensation may be performed as part of the channel estimation process. In such examples, the blocks of the first type (e.g. pilot blocks or low order modulation blocks) may be used after the ICI compensation in order to generate updated channel estimates per OFDM symbol. The updated channel estimates may then be used to improve equalization and detection quality.

Low Order Modulation Blocks as the Blocks of the First Type

As mentioned briefly above, in some implementations, the blocks of subcarriers of the first type (for which the ICI components are initially estimated) may be low order modulation blocks instead of predefined reference blocks. Low order modulation blocks may contain data symbols that have been modulated with lower modulation order than other data symbols (e.g. 256-QAM or 64-QAM may be used for the subcarriers of the second type and 16-QAM, BPSK or QPSK may be used for the sub-carriers of the first type).

Alternatively, the low order modulation blocks may contain data symbols which are constructed from a limited set of constellation points available in the symbol constellation used for subcarriers of the second type. For example, if the subcarriers of the second type use 256-QAM, the low order modulation block (in this case the subcarriers of the first type) may use only the corner symbols of the 256-QAM constellation. This would represent a power scaled QPSK constellation for the receiving entity.

In such implementations, the low order modulation block symbols may be detected before compensation, and the symbols detected from the low order modulation blocks may be used as reference symbols to estimate inter-carrier interference components. The detection process may or may not involve a channel decoding and coding functions for the low order modulation blocks.

Because the modulation order is lower or the used symbol alphabet/constellation is constrained, the Euclidean distance between symbols is larger (also effective symbol error rate is lower) for these blocks, and therefore the hard symbol decisions based on these blocks may be used as if they were the transmitted symbols. This falls into the category of semi-blind estimation, because the data is unknown but the knowledge of the lower order modulation degree or the set of constrained symbol alphabet is required to be known by the receiving entity.

In implementations in which the subcarriers of the first type are low order modulation symbols or symbol alphabet constrained symbols, their location with respect to subcarriers of the second type may be the same as described above when reference subcarriers were used as the subcarriers of the first type. This is because low order modulation symbols (or symbol alphabet constrained symbols) may, after the receiving entity has made hard symbol decisions (after equalization but without channel decoding), be utilised in the performance of ICI compensation in exactly the same manner as the reference subcarriers (e.g. pilot subcarriers).

In some examples, the uplink or downlink control channels (PUCCH or PDCCH) may be used to estimate ICI components. For instance, control channel symbols extended over all OFDM symbols can be first detected and then used as low order modulation blocks to estimate ICI components. Since the modulation and coding scheme used for these channels are, by definition, known by the receiving entity, the use of these channels to estimate the ICI components does not require any additional signalling.

In addition, PUCCH or PDCCH have to be decoded and detected before the receiving entity is able to decode the subcarriers of the second type (the data signal), and are further protected by a CRC based integrity check, so there is a very high probability that all of the symbols are correctly detected. If there is an error in the detection of the control channel, there may be no attempt to detect the shared channel which carries the subcarriers of the second type.

Evaluations

FIGS. 5A, 5B, 6A, 6B and 7A, 7B are graphs illustrating the performance of an inter-carrier interference compensation method as described with reference to the flow diagram of FIG. 3. More specifically, they illustrate the throughput of a wireless link for which inter-carrier interference compensation is performed, for respective relative velocities (between the transmitting and receiving entities) of 30 km/h, 250 km/h and 500 km/h.

Figure 5A:
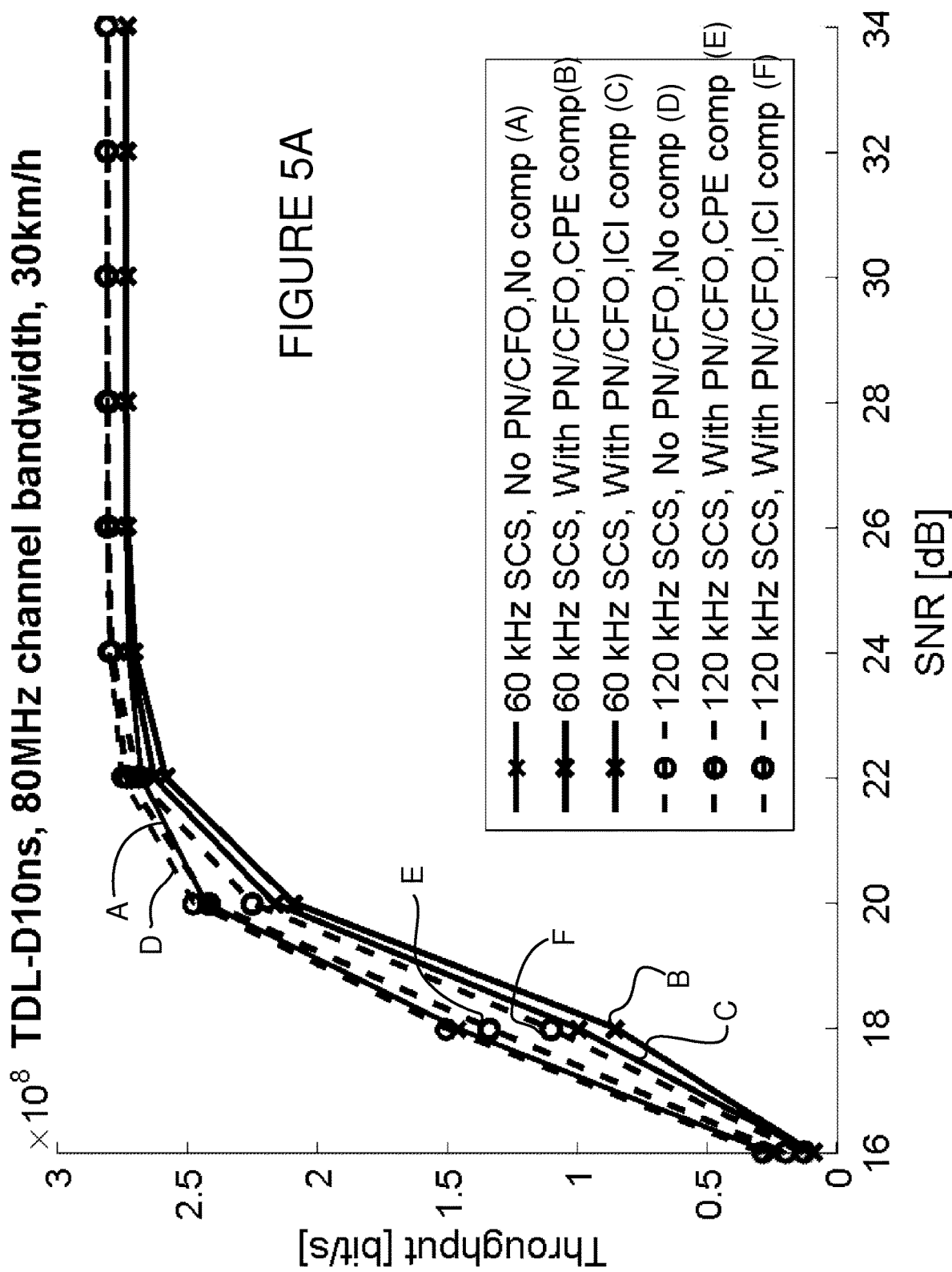
Figure 6A:
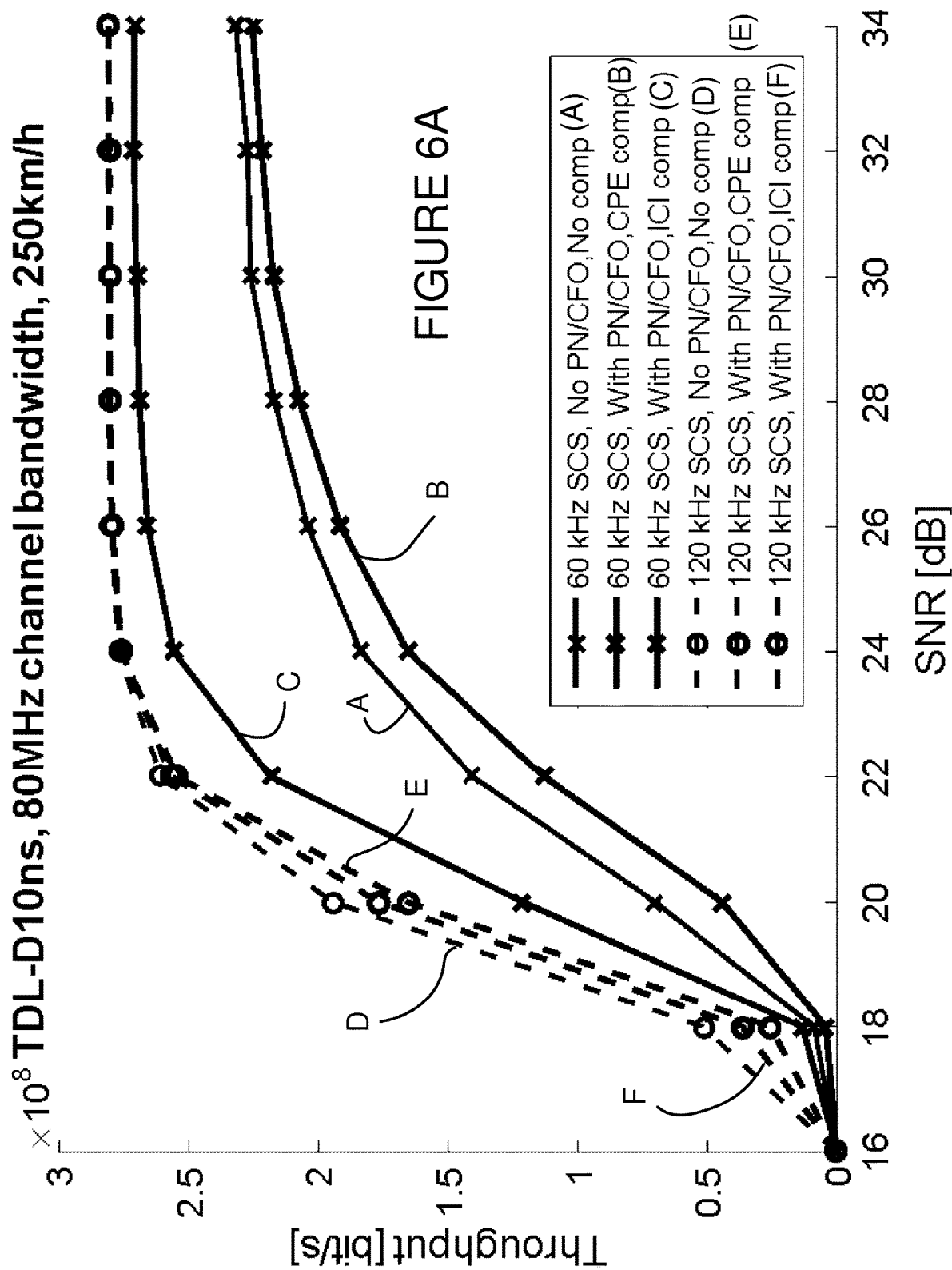
Figure 6B:
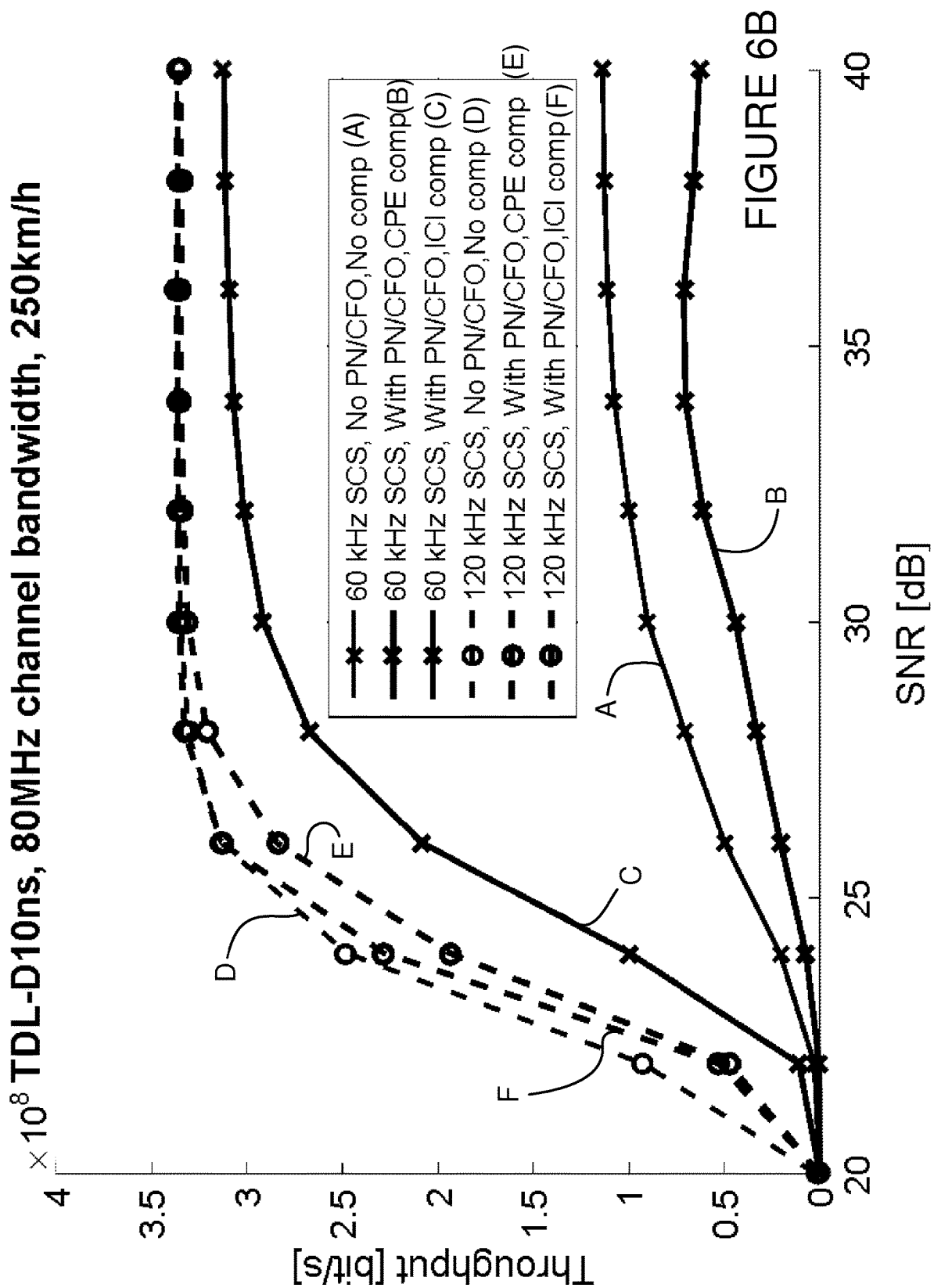
Figure 7B:
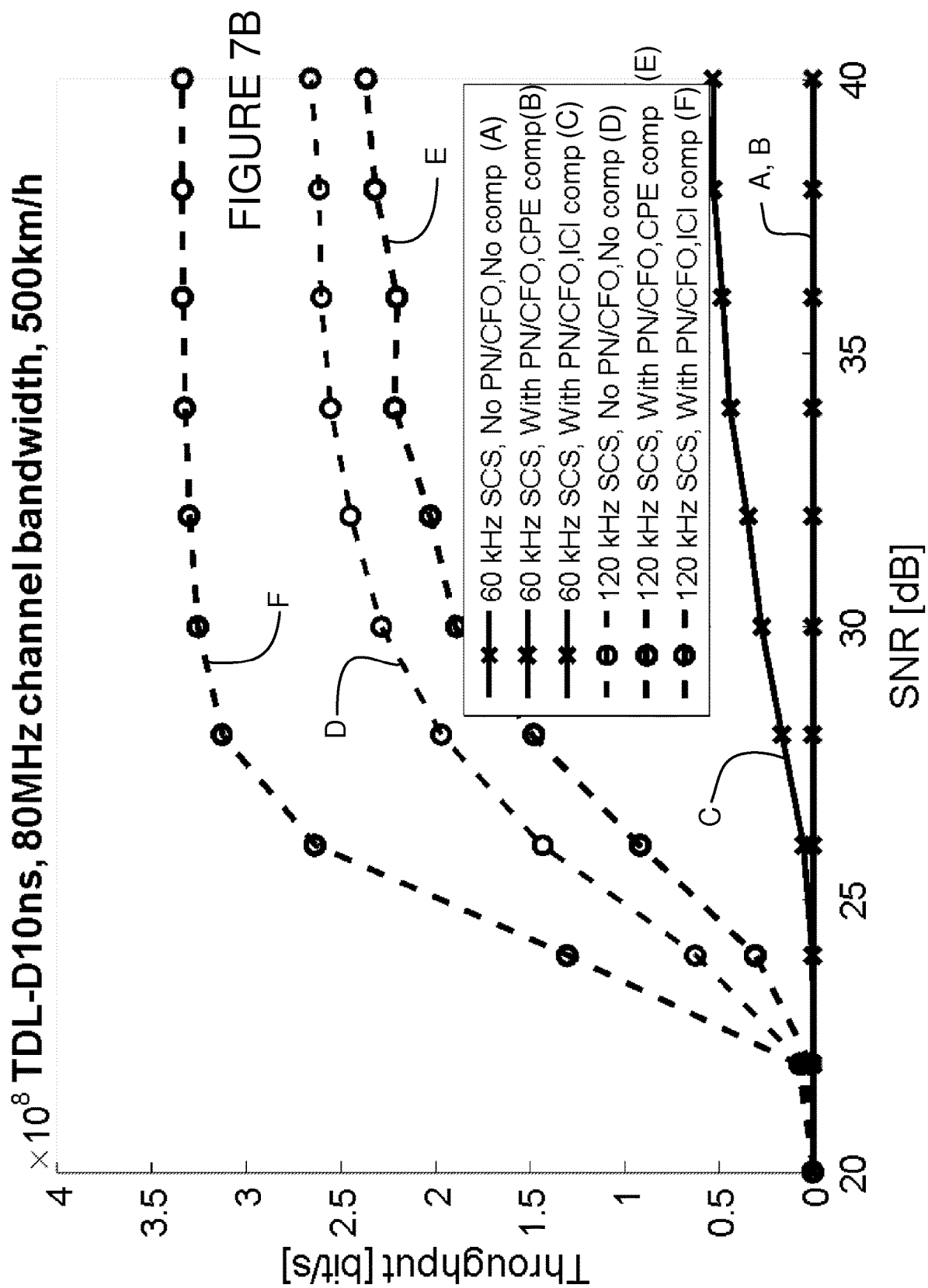

Each of the Figures shows evaluations for both 60 and 120 kHz subcarrier spacings based on an operation frequency of 28 GHz and an 80 MHz bandwidth. Two different modulation and coding schemes are evaluated with FIGS. 5A, 6A and 7A representing 64-QAM with coding rate R=5/6, and FIGS. 5B, 6B and 7B representing 256-QAM with R=3/4.

A Front loaded reference signal (RS) design is assumed, in which the first symbol in the slot of the physical resource block (=12 subcarriers×1 slot, and 7 symbols per slot) is the DMRS symbol and remaining 6 symbols are data symbols. Also, the results illustrated in the Figures assume ideal channel estimation.

In each of the Figures, the lines referenced by A and D represent performance without phase noise (PN) or carrier frequency offset (CFO) error (and without compensation) are provided as a reference. It should be noted, however, that in practice some compensation for PN/CFO errors is required or the radio link does not work at all. In addition, each of the Figures shows lines referenced by B and E which represent performance with phase noise (PN) and carrier frequency offset (CFO) error but with only common phase error (CPE) compensation being performed (so the ICI compensation method describe herein is not performed).

In each of the Figures, the lines referenced by C and F represent the performance resulting from application of the inter-carrier interference methods described herein. Specifically, line C represents performance with a subcarrier spacing of 60 kHz and line F represents performance with a subcarrier spacing of 120 kHz.

For the performance of CPE compensation and ICI compensation, it is assumed that there are $N_{SC}$=12 pilot subcarriers per 14.4 MHz frequency block. This equates to $N_{SC}$ pilots in every 20 or 10 physical resource blocks for subcarrier spacing of 60 or 120 kHz, respectively.

In FIGS. 5A and 5B, in which the relative velocity is 30 km/h, it can be seen that Doppler is not an issue and that performance without compensation (lines A and D) is good. CPE only (lines B and E) and ICI compensation (lines C and F) provide similar results. However, as can be seen from FIG. 5B with 60 kHz SC spacing and 256-QAM, there is already a performance gap between CPE-only (line B in FIG. 5B) and ICI compensation (line C in FIG. 5B).

In FIGS. 6A and 6B, the performance with a relative velocity of 250 km/h is illustrated. In this case, the performance with subcarrier spacing of 120 kHz is good even with CPE compensation only (line E). This is as a result of the larger subcarrier spacing alleviating the inter-carrier interference problem. With a 60 kHz subcarrier spacing, a clear degradation in the reference performance (line A) without PN/CFO errors is observed. Also, CPE-only compensation performance (line B) is clearly worse than with ICI compensation (line C), which is able to maintain throughput close to that provided by 120 kHz subcarrier spacing.

Finally, in FIGS. 8A and 8B, which show performance with a relative velocity of 500 km/h, it can be seem that performance of CPE-only compensation is virtually non-existent with 60 kHz subcarrier spacing and 64-QAM (line B in FIG. 8A), while ICI compensation (line C) allows the link to be used. With 256-QAM (FIG. 8B) and a subcarrier spacing of 120 kHz, there is a clear improvement in the performance of ICI compensation (line F) compared to CPE-only (line E).

Example Physical Configurations of Computing Apparatuses

Figure 8:
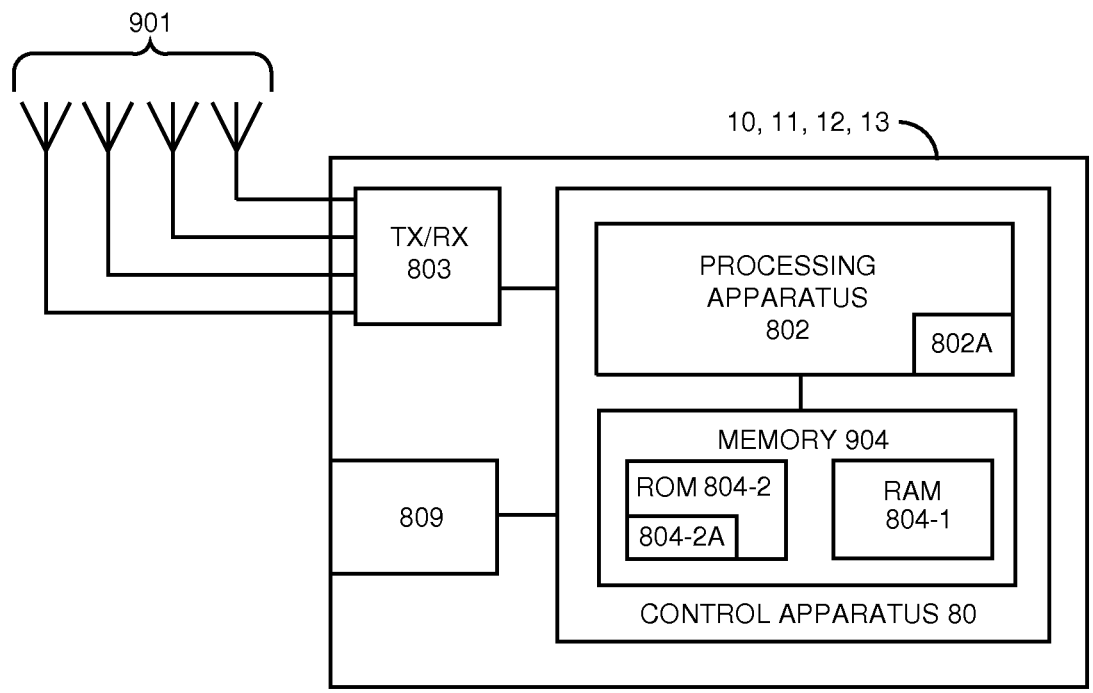
FIG. 8 is a schematic illustration of an apparatus which may be used for performing inter-carrier interference compensation.

FIG. 8 is a schematic illustration of an example configuration of either of the UE-side and network-side communications apparatuses 10, 11, 12, 13 described with reference to FIGS. 1 to 5, which may be configured to perform inter-carrier interference compensation.

The apparatus 10, 11, 12, 13 may comprise a radio frequency antenna (or an array of any suitable number of antennas) 801 which are configured to receive and transmit radio frequency signals. The apparatus 10, 11, 12, 13 may further comprise a radio frequency interface 803, which is configured to handle the radio frequency signals received and transmitted by the antenna 801. The radio frequency interface 803 may also be known as a transceiver.

The apparatus 10, 11, 12, 13 may also comprise a second interface 809 via which it can communicate with other parts of the network. For instance, when the apparatus is a network-side apparatus, the second interface 809 may be wired or wireless and may be used to receive signals and data from the core network. When the apparatus is a UE-side apparatus, the second interface 809 may be wired or wireless and may be used to transmit data to and receive data from one or more UE (for instance, UEs located within the high velocity vehicle).

In addition, apparatus 10, 11, 12, 13 comprises a control apparatus 80. The control apparatus 80 may be configured to process signals received from the radio frequency interface 803 and to control the radio frequency interface 803 to generate suitable RF signals for transmission.

The control apparatus 80 may comprise processing apparatus 802 and memory 804. Computer-readable code 804-2A may be stored on the memory 804 and may, when executed by the processing apparatus 802, cause the control apparatus 80 to perform any of the operations described with reference to FIGS. 1 to 5.

Some further details of components and features of the above-described apparatus 10, 11, 12, 13 and alternatives for them will now be described.

The control apparatuses 80 described above may comprise processing apparatus 501, 402 communicatively coupled with memory 804. The memory 804 has computer readable instructions 804-2A stored thereon which, when executed by the processing apparatus 802 causes the control apparatus 80 to cause performance of various ones of the operations described with reference to FIGS. 1 to 5. The control apparatus 80 may, in some instances, be referred to as simply "apparatus".

The processing apparatus 802 may be of any suitable composition and may include one or more processors 802A of any suitable type or suitable combination of types. Indeed, the term "processing apparatus" should be understood to encompass computers having differing architectures such as single/multi-processor architectures and sequencers/parallel architectures. For example, the processing apparatus 802 may be a programmable processor that interprets computer program instructions 804-2A and processes data. The processing apparatus 802 may include plural programmable processors. Alternatively, the processing apparatus 802 may be, for example, programmable hardware with embedded firmware. The processing apparatus 802 may alternatively or additionally include one or more specialised circuit such as field programmable gate arrays FPGA, Application Specific Integrated Circuits (ASICs), signal processing devices etc. In some instances, processing apparatus 802 may be referred to as computing apparatus or processing means.

The processing apparatus 802 is coupled to the memory 804 and is operable to read/write data to/from the memory 804. The memory 804 may comprise a single memory unit or a plurality of memory units, upon which the computer readable instructions (or code) 804-2A is stored. For example, the memory 804 may comprise both volatile memory 804-1 and non-volatile memory 804-2. In such examples, the computer readable instructions/program code 804-2A may be stored in the non-volatile memory 804-2 and may be executed by the processing apparatus 802 using the volatile memory 804-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 804 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

Figure 9:
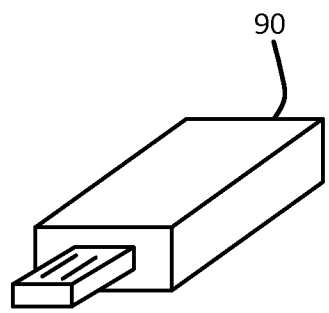
FIG. 9 is an illustration of a computer-readable medium upon which computer readable code may be stored.

The computer readable instructions/program code 804-2A may be pre-programmed into the control apparatus 80. Alternatively, the computer readable instructions 804-2A may arrive at the control apparatus 80 via an electromagnetic carrier signal or may be copied from a physical entity 90 such as a computer program product, a memory device or a record medium such as a CD-ROM or DVD, an example of which is illustrated in FIG. 9. The computer readable instructions 804-2A may provide the logic and routines that enables the entities 10, 11, 12, 13 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will be appreciated that the apparatus 10, 11, 12, 13 illustratively depicted in FIG. 8 and described above with reference to FIGS. 1 to 5 may comprise further elements which are not directly involved with processes and operations in respect which this application is focused.

It also will be appreciated that methods and apparatuses described herein may be utilised in radio networks of various different types, which include but are not limited to 3G, 4G and 5G mobile networks.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
   receiving, by a computing device, one or more OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type;
   for each of the plural blocks of subcarriers of the first type, estimating, by the computing device, inter-carrier interference components;
   estimating, by the computing device, inter-carrier interference components for the subcarriers of the second type using the inter-carrier interference components estimated for the plural blocks of subcarriers of the first type; and
   compensating, by the computing device, for inter-carrier interference in the plural blocks of subcarriers of the second type using the inter-carrier interference components estimated for the subcarriers of the second type, thereby to generate plural compensated blocks of subcarriers of the second type,
   wherein
   as a resulting different weightings can be applied to different compensated subcarriers, wherein compensating for inter-carrier interference in the subcarriers of the processing block comprises:
   transforming the processing block into the time domain;
   transforming the inter-carrier interference components estimated for subcarriers that are included in the processing block into the time domain; and
   using the transformed processing block and the transformed inter-carrier interference components to compensate for inter-carrier interference in the subcarriers of the processing block.

2. The method of claim 1, wherein the OFDM signal is received at a receiving apparatus from a transmitting apparatus, wherein the receiving apparatus is moving relative to the transmitting apparatus, and wherein the estimated inter-carrier interference components result from the movement of the receiving apparatus relative to the transmitting apparatus.

3. The method of claim 1, wherein the subcarriers of the blocks of subcarriers of at least one of
   a) the first type are reference subcarriers,
   or
   b) the second type are data subcarriers.

4. The method of claim 1, wherein the plural blocks of OFDM subcarriers of at least one of
   a) the first type have a lower order modulation than do the plural blocks of OFDM subcarriers of the second type,
   or
   b) the plural blocks of OFDM subcarriers of the first type are control channel blocks,
   or
   c) the plural blocks of OFDM subcarriers of the first type are generated using a constrained-version of the symbol constellation used for generating the plural blocks of OFDM subcarriers of the second type.

5. The method of claim 1, wherein compensating for inter-carrier interference in the plural blocks of subcarriers of the second type using the inter-carrier interference components estimated for the subcarriers of the second type comprises:
determining plural processing blocks based on the plural blocks of subcarriers of the signal, each processing block including at least one block of subcarriers and at least one subcarrier from at least one adjacent block of subcarriers; and
for each of the processing blocks, compensating for inter-carrier interference in the subcarriers of the processing block using the processing block and the inter-carrier interference components estimated for subcarriers that are included in the processing block.

6. The method of claim 1, wherein using the transformed processing block and the transformed inter-carrier interference components to compensate for inter-carrier interference in the subcarriers of the processing block comprises:
performing a sample-wise division of the transformed processing block and the transformed inter-carrier interference components.

7. The method of claim 6, comprising:
transforming, into the frequency domain, the result of the sample-wise division;
identifying the compensated subcarriers from the frequency domain result of the sample-wise division; and
aggregating the compensated subcarriers to produce the plural compensated blocks of subcarriers of the second type.

8. The method of claim 1, comprising:
processing, in the time domain, the transformed inter-carrier interference components estimated for the subcarriers that are included in the processing block prior to using the transformed processing block and the transformed inter-carrier interference components to compensate for inter-carrier interference in the subcarriers of the processing block.

9. The method of claim 8, wherein processing the transformed inter-carrier interference components estimated for the subcarriers that are included in the processing block comprises performing a least squares linear fit of the transformed inter-carrier interference components.

10. The method of claim 1, wherein estimating inter-carrier interference components for the subcarriers of the second type using the inter-carrier interference components estimated for the plural blocks of subcarriers of the first type comprises:
using a Wiener filter that is configured based on the time and frequency correlation properties of the received OFDM signal inter-carrier interference components estimated for the plural blocks of subcarriers of the first type to estimate the inter-carrier interference components for the subcarriers of the second type.

11. Apparatus comprising at least one processor and at least one memory including computer program code which, when executed by the at least one processor, causes the apparatus:
to receive an OFDM signal comprising plural blocks of OFDM subcarriers of a first type and plural blocks of OFDM subcarriers of a second type, wherein the frequencies of the subcarriers of each block of OFDM subcarriers of the first type are contiguous and wherein the plural blocks of subcarriers of the first type are distributed amongst the plural blocks of subcarriers of the second type;
for each of the plural blocks of subcarriers of the first type, to estimate inter-carrier interference components;
to estimate inter-carrier interference components for the subcarriers of the second type using the inter-carrier interference components estimated for the plural blocks of subcarriers of the first type; and
to compensate for inter-carrier interference in the plural blocks of subcarriers of the second type using the inter-carrier interference components estimated for the subcarriers of the second type, thereby to generate plural compensated blocks of subcarriers of the second type,
wherein
as a resulting different weightings can be applied to different compensated subcarriers, wherein the computer program code, when executed by the at least one processor, causes the apparatus to compensate for inter-carrier interference in the subcarriers of the processing block by causing the apparatus:
to transforming the processing block into the time domain;
to transform the inter-carrier interference components estimated for subcarriers that are included in the processing block into the time domain; and
to use the transformed processing block and the transformed inter-carrier interference components to compensate for inter-carrier interference in the subcarriers of the processing block.

12. The apparatus of claim 11, wherein the OFDM signal is received at a receiving apparatus from a transmitting apparatus, wherein the receiving apparatus is moving relative to the transmitting apparatus, and wherein the estimated inter-carrier interference components result from the movement of the receiving apparatus relative to the transmitting apparatus.

13. The apparatus of claim 11, wherein the subcarriers of the blocks of subcarriers of at least one of
a) the first type are reference subcarriers, or
b) the second type are data subcarriers.

14. The apparatus of claim 11, wherein the plural blocks of OFDM subcarriers of at least one of
a) the first type have a lower order modulation than do the plural blocks of OFDM subcarriers of the second type, or
b) the first type are control channel blocks, or
c) the plural blocks of OFDM subcarriers of the first type are generated using a constrained-version of the symbol constellation used for generating the plural blocks of OFDM subcarriers of the second type.

15. The apparatus of claim 11, wherein the computer program code, when executed by the at least one processor, causes the apparatus to compensate for inter-carrier interference in the plural blocks of subcarriers of the second type using the inter-carrier interference components estimated for the subcarriers of the second type by causing the apparatus:
to determine plural processing blocks based on the plural blocks of subcarriers of the signal, each processing block including at least one block of subcarriers and at least one subcarrier from at least one adjacent block of subcarriers; and
for each of the processing blocks, to compensate for inter-carrier interference in the subcarriers of the processing block using the processing block and the inter-carrier interference components estimated for subcarriers that are included in the processing block.

16. The apparatus of claim 11, wherein the computer program code, when executed by the at least one processor, causes the apparatus to use the transformed processing block and the transformed inter-carrier interference components to compensate for inter-carrier interference in the subcarriers of the processing block by causing the apparatus:

to perform a sample-wise division of the transformed processing block and the transformed inter-carrier interference components.

17. The apparatus of claim 16, wherein the computer program code, when executed by the at least one processor, causes the apparatus:

to transform, into the frequency domain, the result of the sample-wise division;

to identify the compensated subcarriers from the frequency domain result of the sample-wise division; and to aggregate the compensated subcarriers to produce the plural compensated blocks of subcarriers of the second type.

18. The apparatus of claim 11, wherein the computer program code, when executed by the at least one processor, causes the apparatus:

to process, in the time domain, the transformed inter-carrier interference components estimated for the subcarriers that are included in the processing block prior to using the transformed processing block and the transformed inter-carrier interference components to compensate for inter-carrier interference in the subcarriers of the processing block.

19. The apparatus of claim 18, wherein the computer program code, when executed by the at least one processor, causes the apparatus to process the transformed inter-carrier interference components estimated for the subcarriers that are included in the processing block by causing the apparatus to perform a least squares linear fit of the transformed inter-carrier interference components.

20. The apparatus of claim 11, wherein the computer program code, when executed by the at least one processor, causes the apparatus to estimate the inter-carrier interference components for the subcarriers of the second type using the inter-carrier interference components estimated for the plural blocks of subcarriers of the first type by causing the apparatus:

to interpolate the inter-carrier interference components estimated for two sequential blocks of subcarriers of the first type to obtain the inter-carrier interference components of the subcarriers of the second type, which have frequencies between the frequencies of the two sequential blocks of subcarriers of the first type.

21. The apparatus of claim 11, wherein the computer program code, when executed by the at least one processor, causes the apparatus to estimate inter-carrier interference components for the subcarriers of the second type using the inter-carrier interference components estimated for the plural blocks of subcarriers of the first type by causing the apparatus:

to use a Wiener filter that is configured based on the time and frequency correlation properties of the received OFDM signal inter-carrier interference components estimated for the plural blocks of subcarriers of the first type to estimate the inter-carrier interference components for the subcarriers of the second type.

* * * * *